(12) United States Patent
Clark, Jr. et al.

(10) Patent No.: US 9,175,705 B1
(45) Date of Patent: Nov. 3, 2015

(54) CONCRETE PANEL CONNECTOR

(71) Applicant: COMPOSITE BUILDING SYSTEMS, INC., Irwindale, CA (US)

(72) Inventors: Paul M. Clark, Jr., Pasadena, CA (US); Brian J. Blonski, Yardley, PA (US)

(73) Assignee: Composite Building Systems, Inc., Irwindale, CA (US)

(*) Notice: Subject to any disclaimer, the term of this patent is extended or adjusted under 35 U.S.C. 154(b) by 0 days.

(21) Appl. No.: 14/213,270

(22) Filed: Mar. 14, 2014

Related U.S. Application Data

(60) Provisional application No. 61/792,364, filed on Mar. 15, 2013, provisional application No. 61/785,854, filed on Mar. 14, 2013.

(51) Int. Cl.
E04B 2/00 (2006.01)
F16B 5/12 (2006.01)
E04C 2/04 (2006.01)

(52) U.S. Cl.
CPC .. *F16B 5/12* (2013.01); *E04C 2/044* (2013.01)

(58) Field of Classification Search
CPC ................................ F16B 5/12; E04C 2/044

USPC ......... 52/582.1, 677, 678, 699, 295, 335, 327
See application file for complete search history.

(56) References Cited

U.S. PATENT DOCUMENTS

| 5,402,616 | A | 4/1995 | Klein |
| 5,414,972 | A | 5/1995 | Ruiz et al. |
| 5,592,796 | A | 1/1997 | Landers |
| 5,688,428 | A | 11/1997 | Maguire |
| 6,125,608 | A | 10/2000 | Charlson |
| 6,185,897 | B1 | 2/2001 | Johnson et al. |
| 6,761,007 | B2 | 7/2004 | Lancelot, III et al. |
| 6,996,945 | B2 * | 2/2006 | Doty ............................ 52/585.1 |
| 7,028,439 | B2 | 4/2006 | Foderberg et al. |
| 7,412,805 | B2 | 8/2008 | Parrish |
| 7,475,862 | B1 * | 1/2009 | Anspach ......................... 249/34 |
| 7,870,702 | B2 | 1/2011 | McKay |
| 8,601,763 | B2 | 12/2013 | Bui |
| 8,776,468 | B2 * | 7/2014 | Henriquez .................. 52/481.1 |
| 2003/0140590 | A1 | 7/2003 | Lancelot, III et al. |
| 2012/0137619 | A1 | 6/2012 | Martter |
| 2012/0233956 | A1 | 9/2012 | Fey |

* cited by examiner

*Primary Examiner* — Mark Wendell
(74) *Attorney, Agent, or Firm* — Knobbe, Martens, Olson & Bear, LLP

(57) ABSTRACT

A connector is used to secure a concrete panel to a structural member. The connector is formed of a composite material and thermally insulates the concrete panel from the structural member.

8 Claims, 21 Drawing Sheets

SECTION A-A

SECTION B-B

CONCRETE PANEL CONNECTOR

CROSS-REFERENCE TO RELATED APPLICATIONS

This application claims the benefit of U.S. Provisional Patent Application No. 61/785,854, filed Mar. 14, 2013, (entitled "CONCRETE PANEL CONNECTOR") and U.S. Provisional Patent Application No. 61/792,364, filed Mar. 15, 2013, (entitled "CONCRETE PANEL CONNECTOR"), the entire disclosures of which are hereby incorporated by reference. Any and all priority claims identified in the Application Data Sheet, or any correction thereto, are hereby incorporated by reference under 37 CFR 1.57.

BACKGROUND OF THE INVENTION

Field of the Invention

Thermal insulation is an important consideration in the choice of materials and design of apparatuses used for the construction of buildings. Generally, building panels often form the exterior surface of a building and are therefore in direct contact with ambient conditions outside of the building. Structural members, on the other hand, often form parts of the interior surface of a building and are therefore in direct contact with ambient conditions inside the building. It can often be the case that conditions within the building, such as temperature, are significantly different from conditions outside the building. As this differential increases, more heat is transferred into or out of the building resulting in additional energy expenditures on heating, ventilation and air condition systems to maintain workable conditions within the building. Therefore, it is important that buildings have thermal insulation and structural members that limit thermal bridging to reduce such energy expenditures.

SUMMARY

Embodiments of the present disclosure generally relate to shear connectors configured to connect concrete panels to structural members of a building structure. The shear connectors can be manufactured using insulating materials configured to reduce thermal transfer between concrete panels and structural members to which the connectors will be attached. The shear connectors can be used to chair up and mechanically link reinforcing mesh in the concrete panel to the panel's structural members.

In some embodiments, the base (e.g., the underside) of the connectors directly contact the concrete panel. In such embodiments, the connector and the concrete panel advantageously create a composite construction such that the composite construction can be used for a shear wall. On the other hand, if further insulating layers are interposed between the base of the connector and the concrete panel, the resultant construction can be used for cladding but not as a shear wall. Thus, having a connector with sufficient insulating properties is more desirable than simply placing a layer of insulation between a connector and a concrete panel.

In some configurations, a wall assembly including a shear connector described herein has a U-values in the range of about 0.15 $W/m^2K$ to about 0.04 $W/m^2K$. In some configurations, the wall assembly has a U-value in the range of about 0.12 $W/m^2K$ to about 0.05 $W/m^2K$. In some configurations, the wall assembly has a U-value in the range of about 0.08 $W/m^2K$ to about 0.06 $W/m^2K$. In some embodiments, the wall assembly has a U-value of less than approximately 0.06 $W/m^2K$. In some configurations, the wall assembly consists of the shear connector, a concrete panel (e.g., about 2 inches or about 2.5 inches thick), and a structural component (e.g., a 4 inch or 6 inch C-section steel member). In some configurations, the wall assembly consists of the shear connector, the concrete panel (e.g., about 2 inches or about 2.5 inches thick), the structural component (e.g., a 4 inch or 6 inch C-section steel member) and a drywall covering. In some configurations, the wall assembly comprises the shear connector, a concrete panel (e.g., about 2 inches or about 2.5 inches thick), and a structural component (e.g., a 4 inch or 6 inch C-section steel member). In some configurations, the wall assembly comprises the shear connector, a concrete panel (e.g., about 2 inches or about 2.5 inches thick), and a structural component (e.g., a 4 inch or 6 inch C-section steel member) in which the shear connector is in direct contact with the concrete panel (e.g., no intervening insulation between the shear connector and the concrete panel).

BRIEF DESCRIPTION OF THE DRAWINGS

These and other features, aspects and advantages of the present invention will now be described with reference to the drawings of several embodiments, which embodiments are intended to illustrate and not to limit the invention, and in which figures.

DETAILED DESCRIPTION OF PREFERRED EMBODIMENTS

Thermal Transmittance ("U-Value")

The thermal transmittance (otherwise referred to as the "U-Value" or the "overall coefficient of heat transfer") of an assembly (e.g., concrete, shear connector, steel stud and inner surface, such as drywall or the like) is defined as the rate of heat transfer through a specified surface area of the assembly divided by the difference of temperatures between one end surface of the assembly and an opposite end surface of the assembly. As such, the U-Value is a measure of the overall insulation characteristics of the assembly. As the U-Value of an assembly decreases, the amount of heat transferred from one end of the assembly to the other end of the assembly proportionally decreases.

For buildings, it is advantageous to have assemblies with lower U-Values since a lower U-Value reduces undesirable heat transfer into a building requiring additional energy to be expended for cooling the building interior or undesirable heat transfer out of a building requiring additional energy to be expended for heating the building interior. As such, a lower U-Value can allow a larger difference in temperature between the outside atmosphere and the building interior with either equivalent, or potentially even less, heat transfer. The U-Values for the building panel assemblies including the embodiments of the shear connectors described below can range from about 0.15 W/m$^2$K to about 0.04 W/m$^2$K, from about 0.12 W/m$^2$K to about 0.05 W/m$^2$K, or from about 0.08 W/m$^2$K to about 0.06 W/m$^2$K. In some embodiments, the U-Values attained by the building panel assemblies including the shear connectors described herein are less than approximately 0.06 W/m$^2$K.

U-Value Testing

Figure 1:
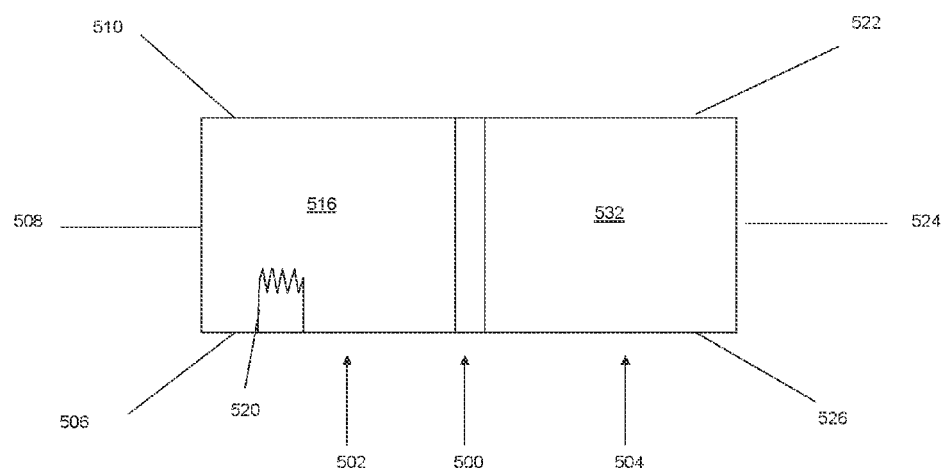
FIG. 1 is a top schematic view of an embodiment of a system for measuring a U-Value of an apparatus.

FIG. 1 is a view of a system that can be used to test the U-Value of an assembly 500. Certain tests have been developed for testing the U-Value and other thermal characteristics of building panels. In some embodiments, such as that illustrated in FIG. 1, the apparatus includes a metering chamber 502 and a climactic chamber 504 placed on opposite surfaces of the assembly (e.g., building panel assembly).

Figure 2:
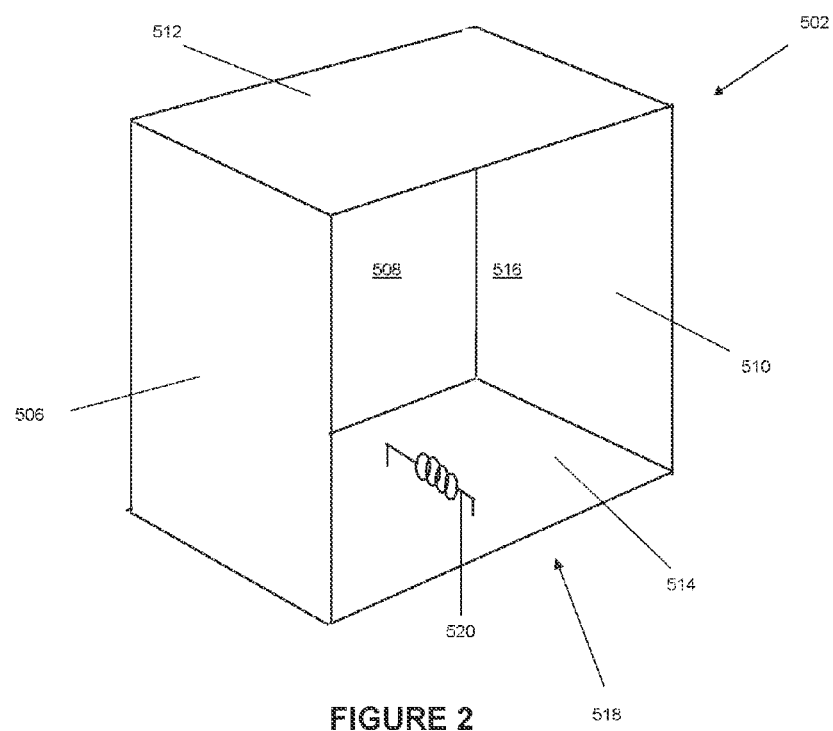
FIG. 2 is a perspective schematic view of an embodiment of a metering chamber of the system of FIG. 1.
Figure 3:
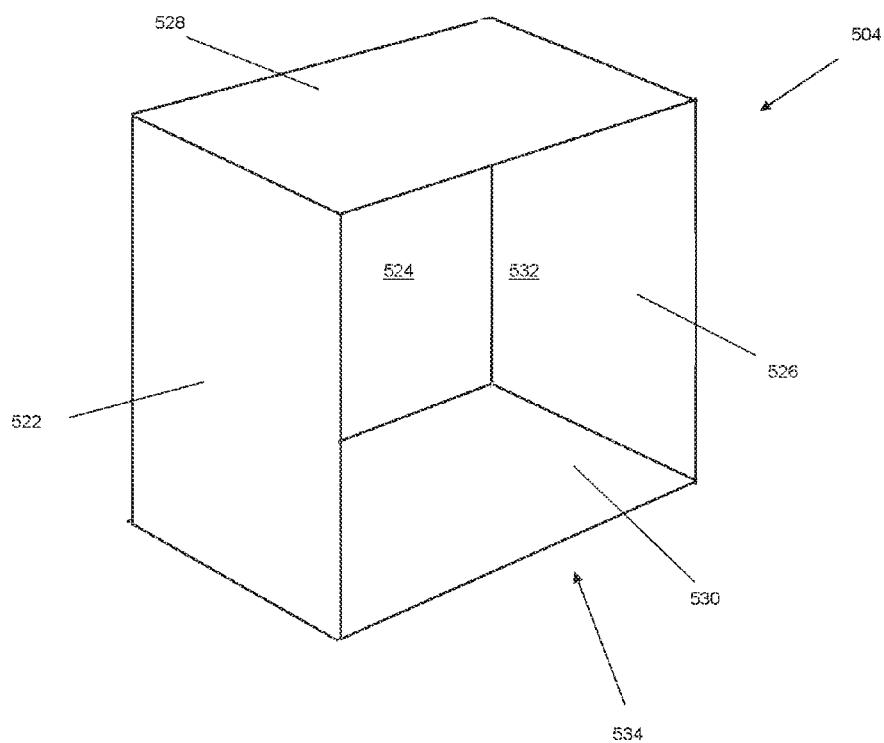
FIG. 3 is a perspective view of an embodiment of a climactic chamber of the system of FIG. 1.

FIG. 2 is a perspective view of one embodiment of a metering chamber 502 that could be used to test the U-Value of an assembly 500. In one embodiment, the metering chamber 502 is a partially enclosed rectangular box that includes five panels 506, 508, 510, 512, 514 partially enclosing an interior volume 516, an open end 518 configured to be placed adjacent to and abutting an end surface of the assembly 500, and a heating element 520 configured to generate heat within the interior volume. In some embodiments, the metering chamber 502 can include either fewer or more panels and may include additional elements such as cooling elements, air flow generating elements such as airflow baffles and air circulation systems, and any other elements to more accurately depict conditions that could occur inside or outside a building. In a preferred embodiment, the panels 506, 508, 510, 512, 514 have high thermal insulation characteristics (e.g., high thermal resistance) such that heat losses due to heat transfer from the panels to the surrounding ambient is reduced. Thermal resistance is a measure of a material's resistance to flow heat from one surface to a second surface given a temperature difference across both surfaces. A higher thermal resistance reduces the amount of heat transferred through the assembly for a given temperature difference across two surfaces. In some embodiments, the thermal resistance of the panels 506, 508, 510, 512, 514 is equal to or greater than 0.83 m$^2$K/W. Reducing such heat transfer helps to increase the likelihood that most heat transfer occurring within the metering chamber 502 is occurring through the assembly being measured.

In some embodiments, the end surface of the assembly 500 is a first surface of the building panel assembly 102 defined as the surface opposite the surface from which the shear connector 100 projects (see FIG. 4 below). Once placed adjacent to and abutting an end surface, such as the surface of the building panel 102, the interior volume 516 is substantially enclosed and a measured amount of heat is input into the heat generating device 520. In some embodiments, the temperature inside the metering chamber 502 remains substantially constant such that the surface of the apparatus facing the metering chamber 502 is at substantially the same temperature as the temperature of the air within the metering chamber 502. By maintaining a constant temperature, the system remains at steady state such that the heat transfer into the assembly 500 can be calculated based on the amount of heat input into the interior volume 516 of the metering chamber and the amount of heat lost due to losses through the panels 506, 508, 510, 512, 514 and other transfer mechanisms (e.g., flanking losses).

FIG. 2 is a perspective view of one embodiment of a climactic chamber 504 that could be used to test the U-Value of an assembly 500. In some embodiments, the climactic chamber 504 can be similar in design to the metering chamber 502 and can be a partially enclosed rectangular box that includes five panels 522, 524, 526, 528, 530 partially enclosing an interior volume 532 and an open end 534 configured to be placed adjacent to and abutting an end surface of the assembly 500 opposite that abutted by the metering chamber 502. In some embodiments, the end surface of the assembly 500 is a second surface of the building panel 102 defined as the surface from which the shear connector 100 projects (see FIG. 4 below). In some embodiments, the open end 534 of the climactic chamber is equal to or greater than the open end 518 of the metering chamber 502. In some embodiments, the climactic chamber 504 can include either fewer or a greater number of panels and may include additional elements, such as cooling elements, air flow generating elements, such as airflow baffles and air circulation systems, and any other elements to more accurately depict conditions that could occur inside or outside a building. In some embodiments, the temperature inside the climactic chamber 504 remains generally constant such that the surface of the assembly 500 facing the climactic chamber 504 is substantially at the same temperature as the temperature of the air in the interior volume 532 of the climactic chamber 504. By maintaining a substantially constant temperature, the system remains at steady state.

The U-Value of the assembly can be measured using the following formula $U=Q/(A*(T_{env,\,c}-T_{env,\,h}))$ where U is the thermal transmittance, Q is the time rate of net heat flow through the assembly 500, A is the area of the opening of the metering chamber 502, $T_{env,\,c}$ is the effective temperature of the cold side surface (i.e, the surface at a lower temperature), and $T_{env,\,h}$ is the effective temperature of the hot side surface (i.e., the surface at a higher temperature). In some embodiments, the metering chamber 502 and climactic chamber 504 can be switched such that the metering chamber 502 abuts the second surface and the climactic chamber 504 abuts the first surface.

Single Hook Shear Connector

Figure 4:
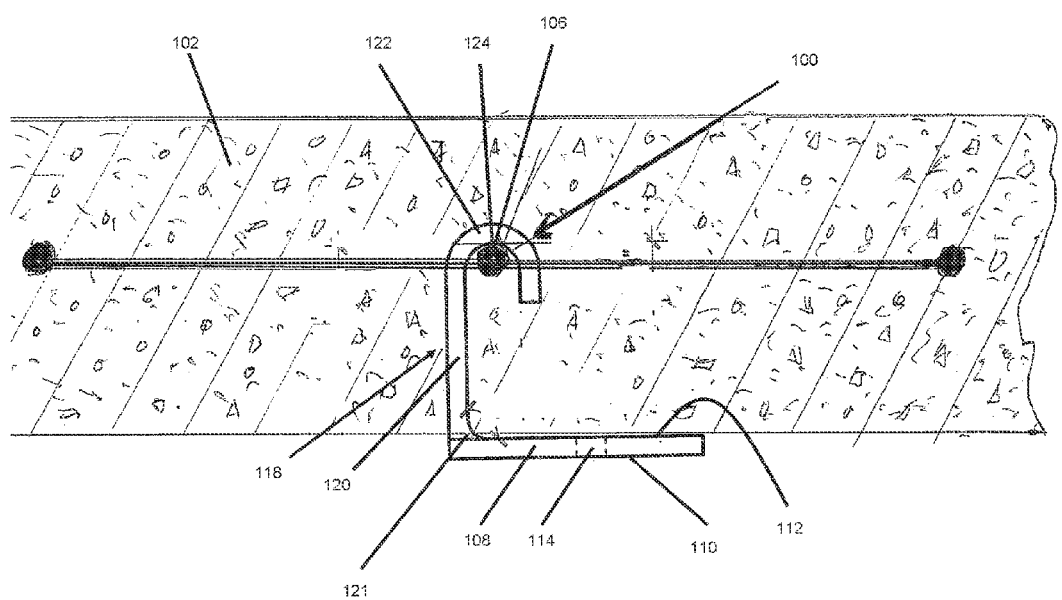
FIG. 4 is a side sectional view of an embodiment of a single-hook shear connector embedded in a building panel.
Figure 5:
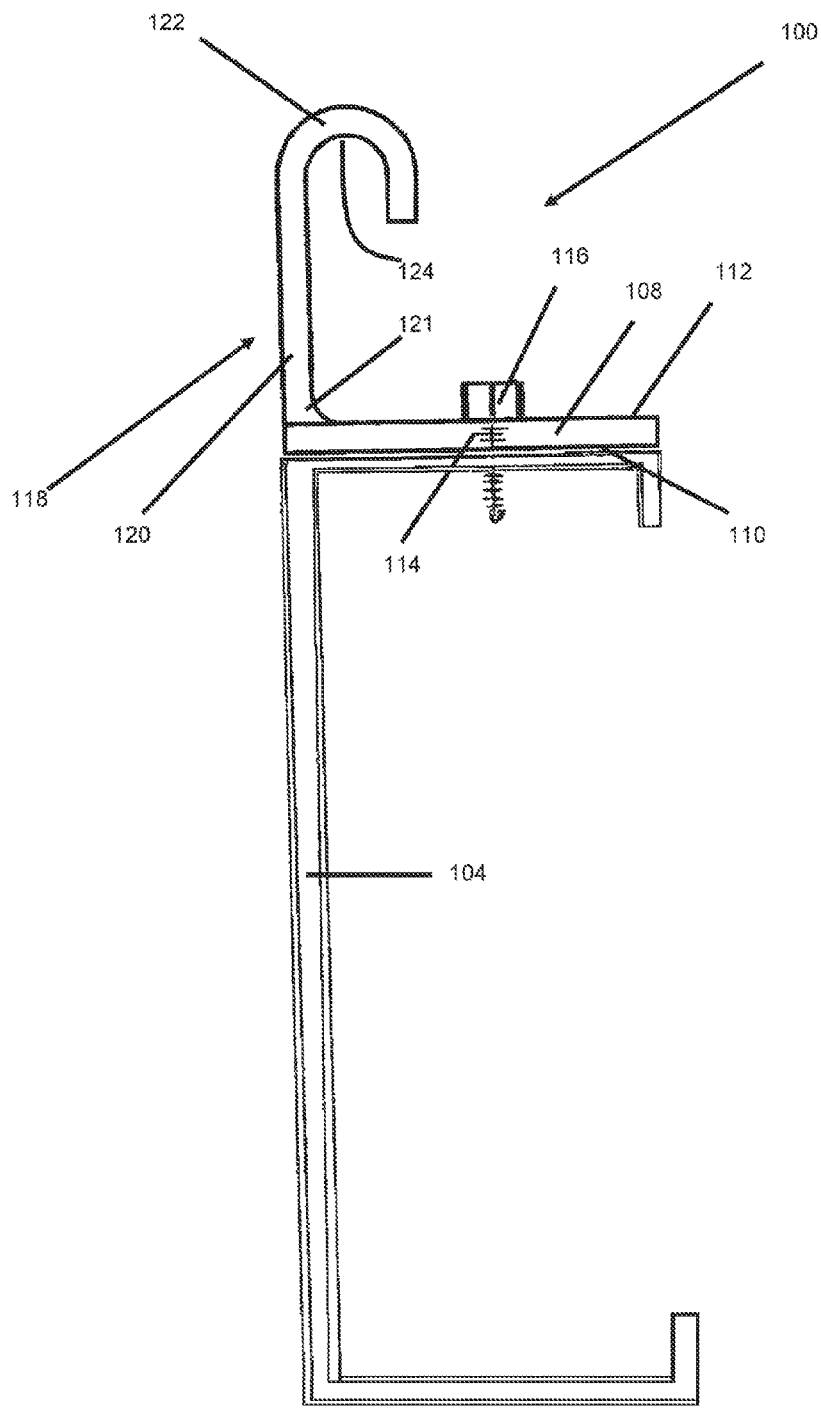
FIG. 5 is a side sectional view of the shear connector of FIG. 4 connected to a structural member.
Figure 6:
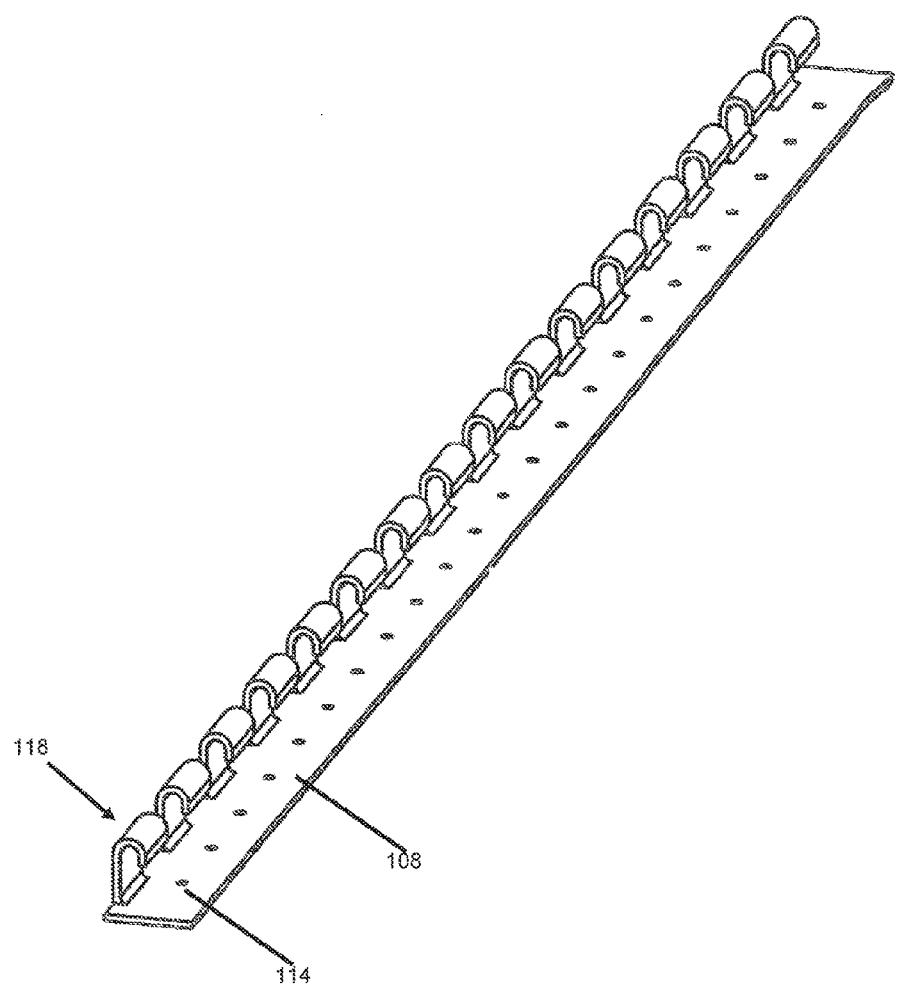
FIG. 6 is a perspective view of the shear connector of FIG. 4.

FIGS. 4-6 are illustrations of an embodiment of a shear connector 100 that is configured to serve as an insulating attachment mechanism between a building panel 102 and a structural member 104. The shear connector 100 can be configured to transfer structural loads and limit heat flow between the building panel 102 and the structural member 104. In some embodiments, such as that illustrated in FIG. 4, the building panel 102 can be manufactured from composite materials or cementicious materials, such as concrete. Furthermore, in some embodiments, such as that illustrated in FIG. 5, the attached structural member 104 can be a c-shaped stud or any other structural element used in the construction industry. At least a portion of the shear connector 100 can be configured to be embedded within the building panel 102. The process of embedding the shear connector 100 within the panel 102 can occur at the time the panel 102 is being formed. For example, in the illustrated embodiment, at least a portion of an extension portion 120 of the shear connector 100 is placed within a casting bed for concrete. The extension portion 120 chairs up the reinforcing mesh 106 while the concrete is being poured such that, when cured into a building panel 102, at least a portion of the shear connector 100 is embedded within the panel 102 and chairs up the reinforcing mesh 106.

The entirety of the shear connector 100 can be manufactured from a variety of materials such as, but not limited to, fiber reinforced polymer composite materials, such as glass fiber reinforcement in a vinyl ester resin matrix, which have advantageous characteristics suitable for building materials. For example, such materials are non-corrosive and rust resistant. Furthermore, such composites generally have generally high thermal resistance thereby reducing thermal transfer through the shear connector 100. The use of shear connectors constructed at least in part from insulating material can reduce thermal conduction between the mesh (e.g., mesh 106) and the structure (e.g., structural member 104). As such, due to the advantageous design of the shear connector 100, discussed in further detail below, as well as the use of advantageous materials, thermal transfer between the structural member 104 and the building panel 102 can be significantly reduced, thereby significantly reducing the U-value of the system (e.g., concrete, stud, connector and possibly inner surface skin), to meet or exceed the more stringent requirements of today's building codes. Furthermore, the shear connector 100 can be manufactured using methods, such as pultrusion, to form the general body shape and subsequently milling the pultruded part to achieve the desired shape. The shear connector 100 can also be manufactured by molding the part into the desired shape.

FIG. 4 is a front section view of the shear connector 100, which is shown embedded within the building panel 102. At a first end of the device, the shear connector 100 has a generally planar rectangular base 108 with an outside surface 110 and an inside surface 112. The shear connector 100 is configured to be attached directly to the structural member 104. The shear connector 100 generally has a width that corresponds to the width of the structural member 104 attached thereto. In some embodiments, the width of the shear connector 100 is greater than or less than the width of the structural member 104 attached thereto. In the illustrated embodiment, the base 108 of the shear connector 100 has a width of one and five-eighths of an inch (1⅝") and a length of four feet (4'). Desirably, the shear connector 100 is sized cover the entire width (i.e., in transverse section extending normally across a length of the member) of a flange of the structural member The outside surface 110 is configured to be placed adjacent to and in contact with the structural member 104. As such, in order to attach the base 108 with the structural member 104, the base 108 has multiple apertures 114 throughout the length of the base 108 configured to allow a fastener 116, such as a structural screw (as shown in FIG. 5), to pass therethrough. The number and size of the apertures 114 as well as the spacing of the apertures 114 can be dictated by performance characteristics desired for that particular building in that particular region. For example, in areas where the structural member 100 may be subject to significant forces, more apertures 114 (e.g., more fasteners 116) may be used to distribute these forces more evenly across the base 108 of the shear connector 100 whereas, in other areas, fewer apertures 114 may be used to reduce the amount of labor, and thereby costs, associated with assembly of the shear connector 100 and structural members 104. In some embodiments, apertures 114 are equally spaced at intervals of about two inches (2"), about four inches (4"), or about six inches (6"). In the illustrated embodiment, the apertures 114 are spaced at intervals of about two inches (2"), have a diameter of about three-sixteenths of an inch (3/16"), and are about five-eighths of an inch (⅝") from the edge opposite the hooked arms 118.

As illustrated in the embodiment shown in FIG. 4, the inside surface 112 of the base 108 can be placed adjacent to and in contact with the building panel 102. In some embodiments, the inside surface 112 is spaced from the building material. In such embodiments, an insulating material with low thermal conductivity, such as spray-on foam or spray-on fiberglass, can be used to fill in the gap between the building panel 102 and the inside surface 112 of the base 108. As such, the inside surface 112 can be placed adjacent the insulating material rather than the building panel 102. This separation provides the additional benefit of reducing thermal transfer through the shear connector 100 by introducing an additional insulating element between the inside surface 112 and the building panel 102. As such, the U-value of the system can be further increased.

The thickness of the base 108, defined as the distance between the outside surface 110 and the inside surface 112, is chosen based on factors such as, but not limited to, the desired U-value of the assembly and manufacturing costs. Increasing the thickness of the base 108 advantageously reduces the thermal transfer further and therefore reduces the U-value of the system. In some embodiments, the thickness of the base 108 can range from about one-sixteenth of an inch (1/16") to upwards of an inch (1") or more. In the illustrated embodiment, the thickness of the base of about one-eighth (⅛") of an inch. However, in embodiments where the base 108 is spaced from the building panel 102, the thickness can advantageously be reduced due to the reduction of thermal transfer associated with use of an additional insulating material between the base 108 and the building panel 102 provided that the additional insulating material has a low or lower thermal conductivity than the shear connector 100.

With continued reference to FIG. 4, at a second end of the device, the shear connector 100 has multiple hooked arms 118 configured to be embedded within the building material 102 to provide a substantially stable and secure attachment of the structural member 104 to the building material 102. In the illustrated embodiment, the base 108 and the hooked arms 118 form a single, integral unit. The hooked arms 118 of the shear connector 100 have an extension portion 120 that, at a first end, extends from the inside surface 112 of the base 108 in a direction perpendicular to the inside surface 112 along the edge of the inside surface 112. The angle at which the extension portion 120 extends from the inside surface 112 can vary depending on the application. A fillet 121 can placed along the inside surface 112 to reduce localized stresses and reduce the possibility of failure at this point of the shear connector 100 if a significant force is applied. At a second end, the hooked arms 118 have a hooked member 122. The length of the hooked arm 118, defined as the distance between the inside surface 112 and the uppermost portion of the inside surface 124 of the hooked member 122, can be chosen based upon the desired placement of the shear connector 100 within the building panel 102 and the desired thermal transfer characteristics between the building panel 102 and the structural member 104. For example, the length may be increased in embodiments where it is desired that the base 108 be separated from the building panel 102 or the shear connector 100 is adjusted such that the hooked arms 118 are placed closer to the bottom surface of the building panel. In some embodiments, the length of the hooked arm 118 can range from about one inch (1") to about two inches (2"). In the illustrated embodiment, the length of the hooked arm is about one and a quarter inches (1¼"). Furthermore, spacing of the multiple hooked arms 118 can be chosen based upon factors, such as, but not limited to, the spacing between parallel wires of the reinforcing mesh 106. In typical industrial applications, the spacing of these parallel wires are normally either four inches (4") or (6"). Therefore, in the illustrated embodiment, the spacing of the multiple hooked arms 118 is about two inches (2") so that no hooked member interferes with the reinforcing mesh 106. In some embodiments, the hooked arm 118 of the shear connector 100 can be located between the edges of the inside surface 112, such as midway across the base 108. Positioning the extension portion 120 closer to the fasteners 116 may be advantageous in cases of high structural loads.

At the other end of the extension portion 120 is a hooked member 122 that is configured to provide additional stability and strength to the attachment between the shear connector 100 and the building panel 102. In particular, the hooked member 122 significantly increases what is termed in the industry as the "pull-out strength" of the shear connector 100 (i.e., the amount of force necessary to remove the shear connector 100 from the building panel 102 after the shear connector 100 has been embedded within the building panel 102). As should be apparent, the "pull out strength" is a significantly important parameter in the design of building materials because it is highly desirable and advantageous that the structural members 104 not be easily removed from building panels 102. This parameter is particularly relevant in instances where significant forces are applied to the building panels 102 and the structural members 104, which tend to pull the panels and the members apart, such as during an earthquake.

As viewed in FIG. 4, the hooked member 122 extends in a horizontal direction into the building panel 102, which is generally perpendicular to the direction of force (i.e., vertical) applied when attempting to remove the shear connector 100 from the building panel. As such, by extending into the building panel 102 in this way, the hooked member 122 increases the interface between the shear connector 100 and the building panel 102, thereby allowing the hooked member 122 to transfer a substantial amount of the force applied to the shearing connector 100 to the building panel 102. This act of transferring additional force into the building panel 102 reduces the likelihood that the shear connector 100 will be removed from the building panel 102 when a significant force is applied.

Additionally, in the illustrated embodiment, the hooked member 122 has a generally U-shaped cross-sectional area that is configured to chair up a reinforcing mesh 106. As viewed in FIG. 4, the reinforcing mesh 106, which is a substantially planar grid of wires embedded within the building panel 102, extends throughout the panel 102 in both the horizontal direction and in the direction running into and out of the page of FIG. 4 (not shown). The mesh 106 not only provides additional strength to the building panel 102 by potentially placing the building material in compression but can also advantageously be used to increase the "pull out strength" of the shear connector 100 even further. When the shear connector 100 and the mesh 106 are coupled together when embedded within the building material 102 such that the inside surface 124 of the hooked member 122 is adjacent to and, ins some cases, in direct contact with the mesh 106, the mesh 106 distributes forces applied by the hooked member 122 across the entire portion of the building panel 102 in which the mesh 106 is embedded. This distribution of force of the localized force from the hooked member 122 thereby additionally increases the "pull out strength" of the shear connector by reducing the likelihood of failure of the building panel 102.

As such, the radius of the hooked member is based on, among other factors, the desired amount of "pull-out strength," the radius of the wires in the reinforcing mesh 106, and the costs of manufacture. In some embodiments, the radius of the hooked member can range from about one-eighths of an inch (⅛") to about an inch (1"). In some embodiments, the radius of the hooked member can range from about one-sixths of an inch (⅙") to one three-quarters of an inch (¾"). In some embodiments, the radius of the hooked member can range from about one-quarter of an inch (¼") to about one-half of an inch (½"). In the illustrated embodiment, the radius of the hooked member is about one-quarter of an inch (¼"). Additionally, the hooked member 122 may have an extended member 120 that provides the additional advantage of facilitating chairing up the mesh 106 with the hooked member 122 during the process of embedding both elements within the building panel 102.

Double Hook Shear Connector

Figure 7:
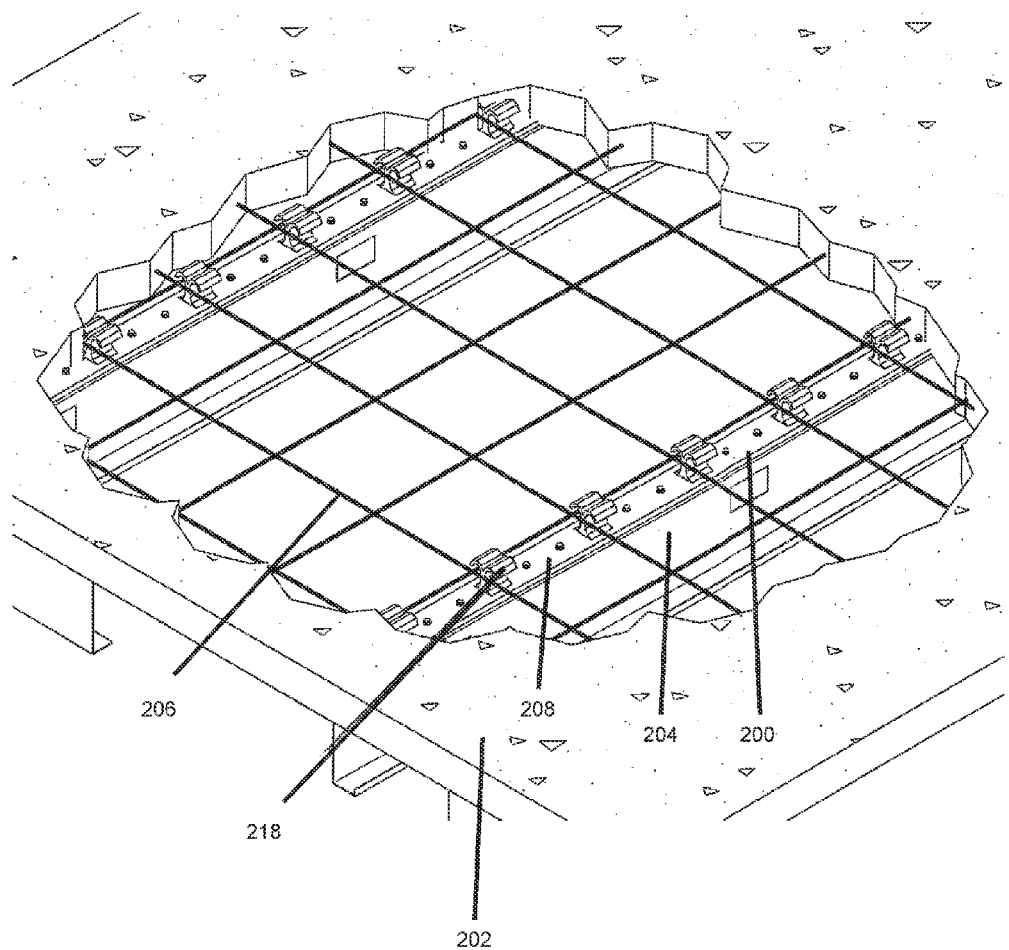
FIG. 7 is a partial sectional view of an embodiment of a double-hook shear connector embedded in a building panel and attached to a structural member.
Figure 8:
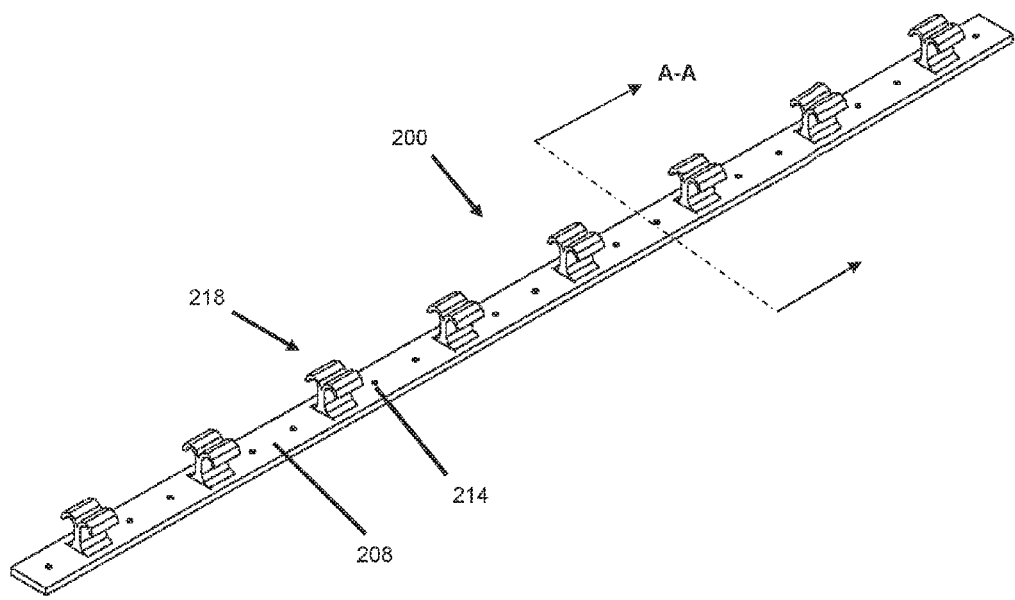
FIG. 8 is a perspective view of the shear connector of FIG. 7.
Figure 9:
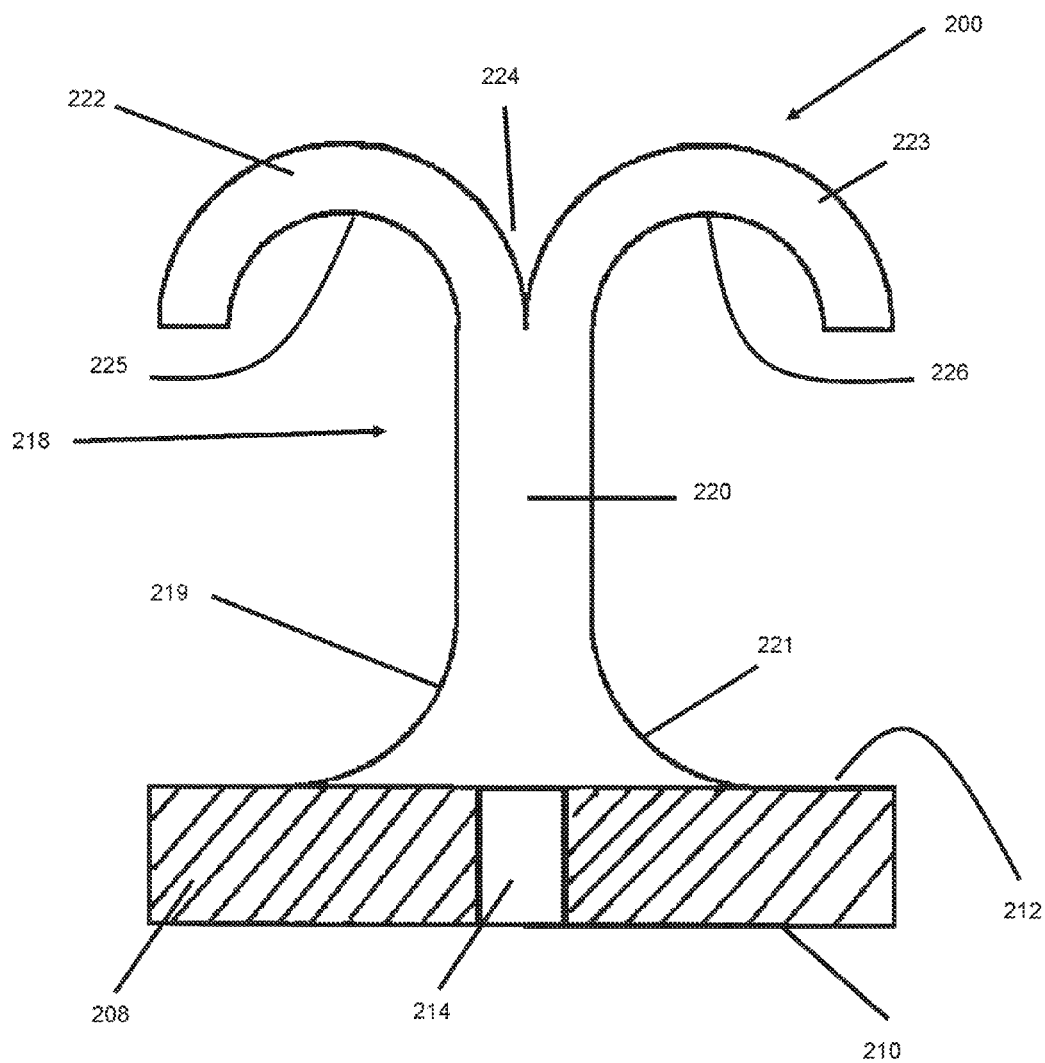
FIG. 9 is a sectional view of the shear connector of FIG. 7 taken along line A-A.

FIGS. 7-9 are illustrations of an embodiment of a shear connector 200 that is configured to serve as an insulating attachment mechanism between a building panel 202 and a structural member 204. As with the above-mentioned shear connector 100, this second embodiment of the shear connector 200 is configured to transfer structural loads and limit heat flow between the building panel 202 and the structural member 204. The shear connector 200 can be configured to chair up a reinforcing mesh 206 when embedded in the building panel 202. Furthermore, the general construction and operating principles of shear connector 200 are similar to that of the shear connector 100. Like the shear connector 100, the shear connector 200 can be manufactured using fiber reinforced polymer composite materials that provide structural integrity and advantageous thermal resistance characteristics. As such, reference should be made to the general construction of shear connector 100 except as otherwise distinguished below.

FIG. 7 is a view of the shear connector 200 embedded into a building panel 202 at a first end and attached to a structural member 204 at a second end of the device. At the first end of the device, the shear connector 200 has a generally planar rectangular base 208 with an outside surface 210 and an inside surface 212 that is attached to the structural member 204. In the illustrated embodiment, the base 208 of the shear connector 200 has a width of about one and five-eighths of an inch (1⅝") and a length of about four feet (4'). In some embodiments, the width of the shear connector can vary between, for example, about one quarter inch (0.25") and about 3 inches (3"). In some embodiments, the width can be about 2 inches (2"). The width of the shear connector 200 can vary greatly. The length of the shear connector 200 can vary greatly depending on the parameters of the building or other application for which the shear connector 200 is used. In some embodiments, the inside surface 212 (see, e.g., FIG. 9) is in contact with the building panel 202. In some embodiments, the inside surface 212 is spaced from the building panel 202 with insulating material placed therebetween.

The outside surface 210 can be configured to be placed adjacent to and in contact with the structural member 204. The base 208 has multiple apertures 214 throughout the length of the base 108 configured to allow a fastener, such as a structural screw, to pass therethrough. Like the above-mentioned shear connector 100, the number and size of the apertures 214 as well as the spacing can be dictated by the desired performance characteristics. In some embodiments, the apertures 214 are substantially equally spaced at intervals of about two inches (2"), about four inches (4"), or about six inches (6"). In the illustrated embodiment, the apertures 214 are spaced at intervals of about two inches (2") between adjacent apertures 214 and about four inches (4") between apertures separated by the hooked arms 218. Furthermore, in the illustrated embodiment, the apertures 214 have a diameter of about three-sixteenths of an inch ($3/16$"), and are generally centered between the two edges of the base 208.

In some embodiments, the thickness of the base 208 can range from about one-sixteenth of an inch ($1/16$") to upwards of an inch (1") or more. In the illustrated embodiment, the thickness of the base is about three-tenths of an inch ($3/10$"). However, in embodiments, where the base 208 is spaced from the building panel 202, the thickness can advantageously be reduced. In other embodiments, the thickness can be increased to further increase the U-value of the system.

With continued reference to FIG. 9, at a second end of the device, the shear connector 200 has multiple hooked arms 218 configured to be embedded within the building material 202. The hooked arms 218 can have an extension portion 220 that, at a first end, extend from the inside surface 212 of the base 208 in a direction generally perpendicular to the inside surface 212. The extension portion 220 can be centered between both edges. In the illustrated embodiment, the base 208 and the hooked arms 218 form a single, integral unit. Two fillets 219, 221 can be placed along the inside surface 212 to reduce localized stresses and to reduce the possibility of failure at these points of the shear connector 200. At a second end, the hooked arms 218 can have two hooked members 222, 223 extending generally horizontally in opposite directions. In some embodiments, the void 224 between the two members 222, 223 can be filled in to reduce the localized stresses in that area, particularly the intersection of both members 222, 223 when forces are applied. In some embodiments, the length of the hooked arm 218, defined as the distance between the inside surface 212 and the uppermost portion of the inside surface 225 of the hooked members 222, 223, can range from about one inch (1") to about two inches (2"). In the illustrated embodiment, the length of the hooked arm is about one and a quarter inches ($1 1/4$"). Many variations are possible. Furthermore, in the illustrated embodiment, the spacing of the multiple hooked arms 218 is about six inches (6") so that no hooked arm 218 interferes with the reinforcing mesh 206.

The dual member 222, 223 design of the hooked arms 218 advantageously increases the "pull-out strength" of the shear connector 200. Due to the inclusion of two members 222, 223 extending in opposite directions, the hooked members 222 and 223 each brace the shear connector 200 and increase the "pull-out strength" by increasing the interface along both the first member 222 and the second member 223. Additionally, because the hooked arms 118 are centered between both edges of the base 228 and because both hooked members 222, 223 exert similar counter-forces in the presence of a "pull-out" force, a moment force about the connection between the base 208 and hooked arms 218 is advantageously reduced thereby further reducing the potential for failure at this point of the shear connector 200.

As with the above-described shear connector 100, the shear connector 200 can be configured to chair up a reinforcing mesh 206 at least along one side of hooked members 222, 223 as shown in FIG. 7 to further increase the "pull-out strength" of the shear connector 200. The hooked members 222, 223 can have a generally semi-circular cross sectional area. In some embodiments, the radius of the hooked member can range from about one-eighths of an inch ($1/8$") to an inch (1"). In more some embodiments, the radius of the hooked member can range from about one-sixths of an inch ($1/6$") to about three-quarters of an inch ($3/4$"). In some embodiments, the radius of the hooked member can range from about one-quarter of an inch ($1/4$") to about one-half of an inch ($1/2$"). In the illustrated embodiment, the radius of the hooked member is about one-quarter of an inch ($1/4$"). Many variations in the radius of the hooked members 222, 223 are possible.

Double Hook Shear Connector with Hollow Base

Figure 15:
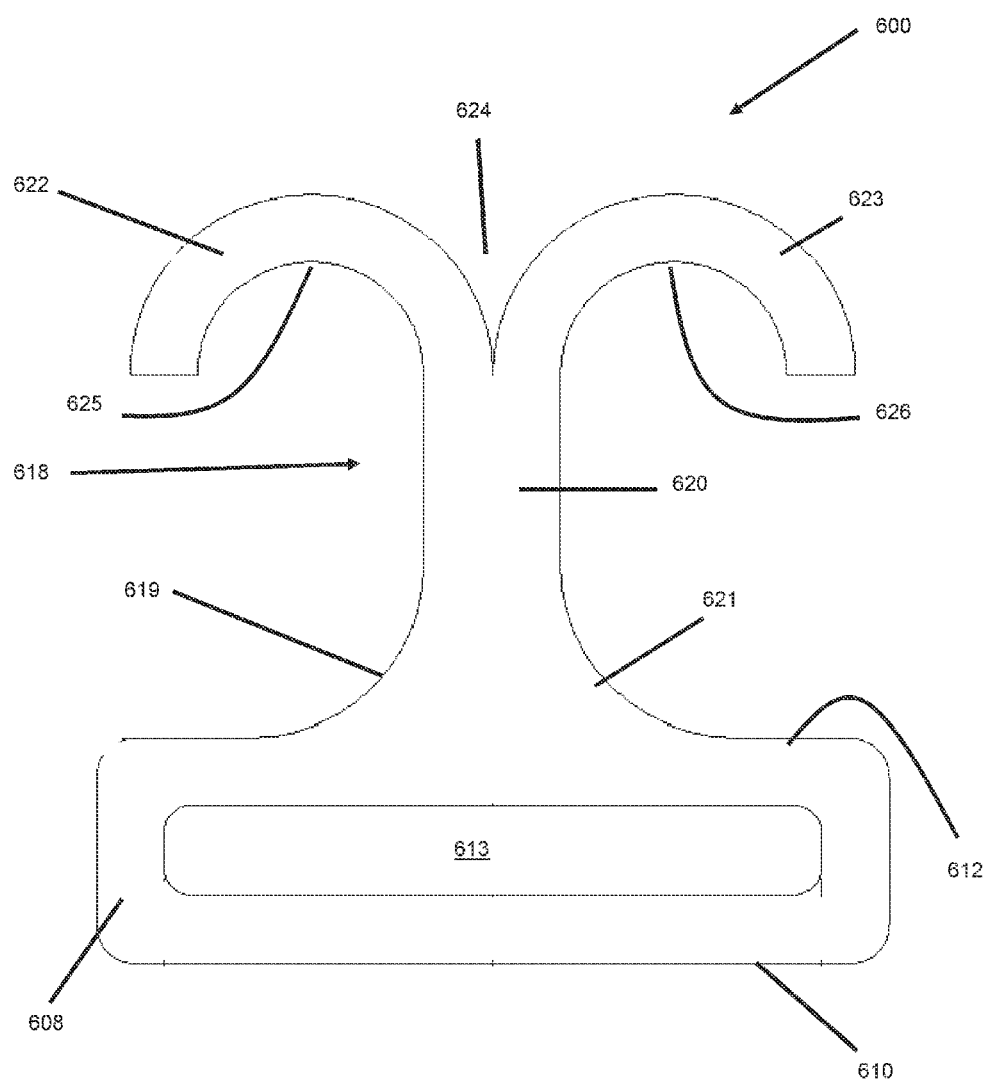
FIG. 15 is a side sectional view of an embodiment of a double-hook shear connector having a hollow channel.

FIG. 15 is an illustration of an embodiment of a shear connector 600 that is configured to serve as an insulating attachment mechanism between a building panel and a structural member. As with the above-mentioned shear connectors, such as the shear connector 200, the shear connector 600 is configured to transfer structural loads and limit heat flow between the building panel and the structural member. The shear connector 600 can be configured to chair up a reinforcing mesh when embedded in the building panel. Furthermore, the general construction and operating principles of the shear connector 600 can be similar to that of the shear connector 200. Like the shear connector 200, the shear connector 600 can be manufactured using fiber reinforced polymer composite materials that provide structural integrity and advantageous thermal resistance characteristics. Furthermore, like shear connector 200, shear connector 600 maintains the benefits and advantages of a dual hooked member design.

FIG. 15 is a front sectional view of the shear connector 600, which can be embedded into a building panel at a first end and attached to a structural member at a second end of the device. At the first end of the device, the shear connector 600 has a generally planar rectangular base 608 with an outside surface 610 and an inside surface 612 that is attached to the structural member. In the illustrated embodiment, the base 608 of the shear connector 600 has a width of about one and five-eighths of an inch ($1 5/8$") and a length of about four feet (4'), though both the width and length of the shear connector 600 can vary widely depending on the application for which the shear connector 600 is used. In some embodiments, the inside surface 612 is in contact with the building panel. In some embodiments, the inside surface 612 is spaced from the building panel with insulating material placed therebetween. In some embodiments, the thickness of the base 608 can range from about one-sixteenth of an inch ($1/16$") to upwards of an inch (1") or more. In the illustrated embodiment, the thickness of the base is about one-half of an inch ($1/2$"). In embodiments where the base 608 is spaced from the building panel, the thickness can be reduced. In other embodiments, the thickness can be increased to further increase the U-value of the system.

The base 608 also has a channel 613 running throughout the length of the base 608. This channel 613 may provide thermal insulation by providing a layer of insulating material or fluid, such as air, between the outside surface 610 and the inside surface 612. In other embodiments, the channel 613 may be filled with other material with thermal insulation characteristics more advantageous than materials used for the base 608. In some embodiments, the channel 613 has a width of about 1.450 inches and a thickness of about 0.200 inches. In some embodiments, the width may be increased and the thickness may be increased to potentially provide more advantageous thermal characteristics. In some embodiments, the width and/or thickness may be decreased to provide more structural rigidity for the base 608. Plugs may be used at both ends of the channel 613 to reduce or eliminate the likelihood that concrete ingresses into the channel while concrete is being poured.

As with the shear connector 200, the outside surface 610 can be configured to be placed adjacent to and in contact with the structural member. The base 608 may have multiple apertures throughout the length of the base 608 configured to allow a fastener, such as a structural screw, to pass therethrough. As discussed above with respect to the other embodiments of the shear connectors, the number, spacing, and size of the apertures can be dictated based on the required performance characteristics.

With continued reference to FIG. 15, at a second end of the device, the shear connector 600 has multiple hooked arms 618 configured to be embedded within the building material. The design of the hooked arms 618 are similar to that of the hooked arms 218 of the shear connector 200. As such, the hooked arms can have an extension portion 620 extending from an inside surface 612 of the base 608, fillets 619 and 621 to reduce localized stresses along those areas, and hooked members 622 and 623 with a void 624 therebetween. In some embodiments, the void 624 can be filled in to reduce localized stresses in the area. In some embodiments, the length of the hooked arm 618, defined as the distance between the inside surface 612 and the uppermost portion of the inside surface 625 of the hooked members 622 and 623 can range from about one inch (1") to about two inches (2"). Many variations are possible. In the illustrated embodiment, the length of the hooked arm is about one and a half inches (1.5").

The hollow base 608 of the shear connector 600 may be implanted with any other integrally formed shear connector such as the shear connector 100, for example but without limitation.

Sleeve and Strip Shear Connector

Figure 10:
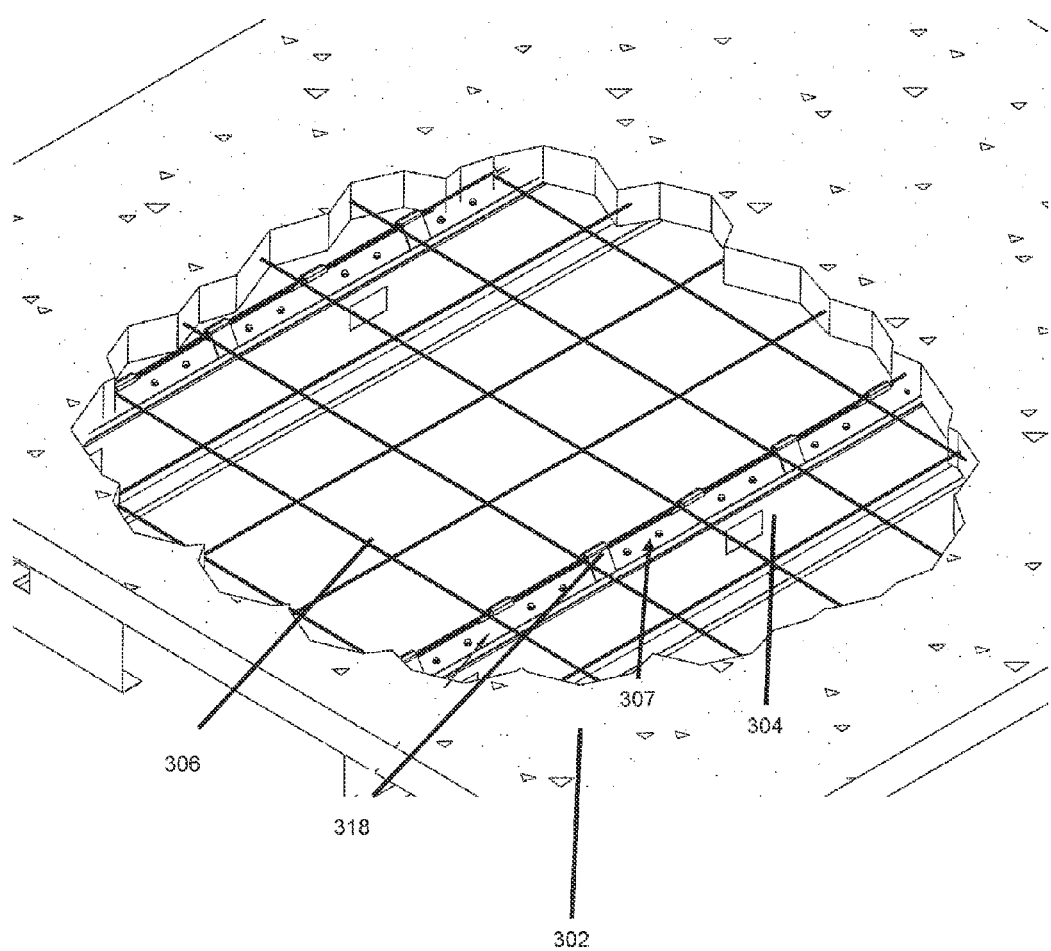
FIG. 10 is a partial sectional view of an embodiment of a sleeve and strip shear connector embedded in a building panel and attached to a structural member.
Figure 11:
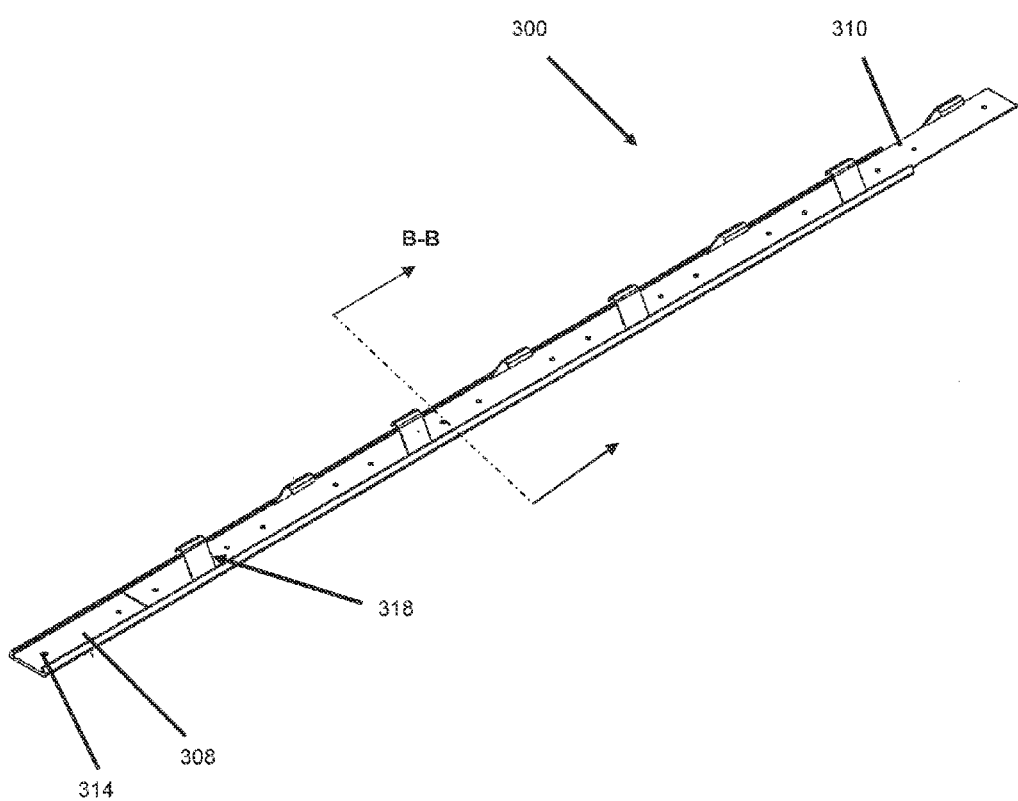
FIG. 11 is a perspective view of the shear connector of FIG. 10 in a partially engaged state.
Figure 12:
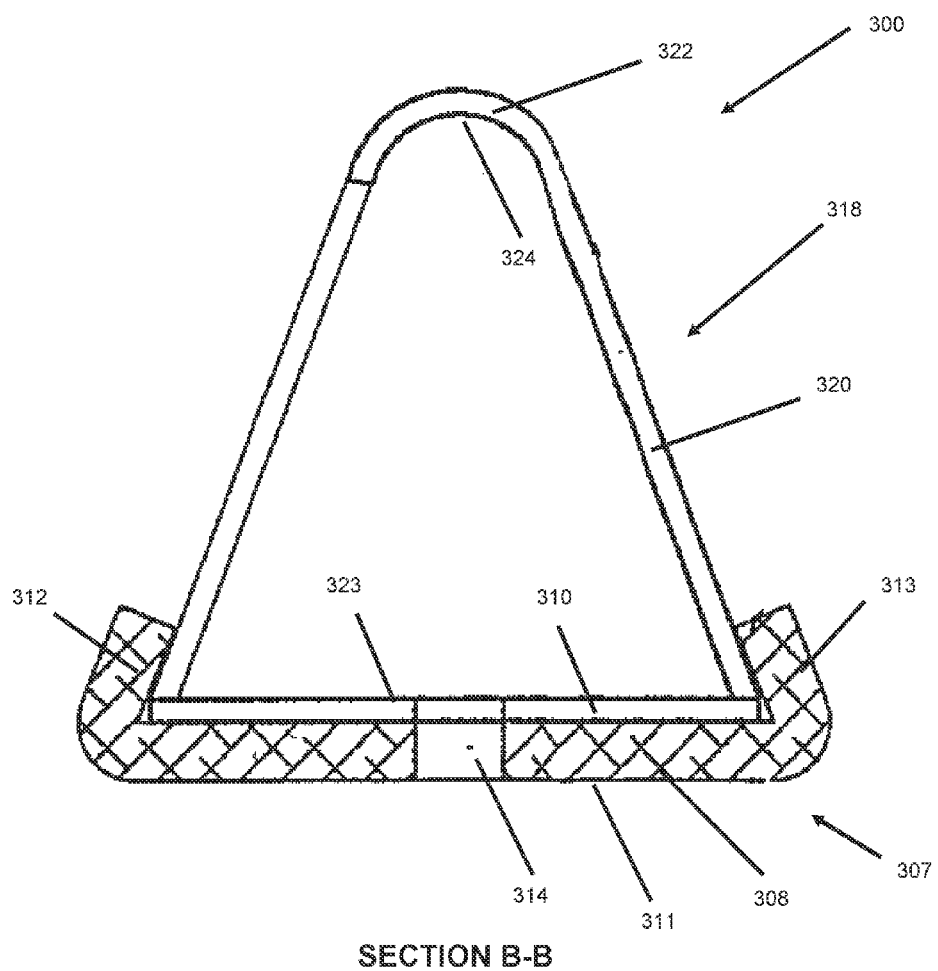
FIG. 12 is a sectional view of the shear connector of FIG. 10 along line B-B.

FIGS. 10-12 are illustrations of an embodiment of a shear connector 300 that is configured to serve as an insulated attachment mechanism between a building panel 302 and a structural member 304. As with the above-mentioned shear connectors 100, 200, 600, this fourth embodiment of the shear connector 300 can be configured to transfer structural loads and limit heat flow between the structural member 304 and the building panel 302. Furthermore, the general operating principles of the shear connector 300 are similar to that of the shear connectors 100, 200, 600. The shear connector 300 can be configured to chair up a reinforcing mesh 306 when embedded in the building panel 302. As such, reference should be made to the general construction of the shear connectors 100, 200, 600 except as otherwise distinguished below.

The shear connector 300 can be formed of two separate components—a sleeve 308 and a strip 310—which, after manufacture, are combined into the shear connector 300. The sleeve 308 can be manufactured from a variety of materials such as, but not limited to, fiber reinforced polymer composite materials. In the illustrated embodiment, the sleeve 308 is manufactured from a composite, such as glass fiber reinforcement in a vinyl ester resin matrix. The strip 310 can also be manufactured from a variety of materials such as, but not limited to, metals including stainless steel and titanium. In the illustrated embodiment, the strip 310 is manufactured from 18 gauge steel. Separating the shear connector 300 into two components can significantly reduce the costs of manufacture by allowing, for example, the sleeve 308 to be pultruded with little post-manufacturing processing, such as milling, whereas the strip 310 can be molded if the material lends itself better to such manufacturing processes.

FIG. 12 is a front section view of the shear connector 300, which is shown with the sleeve 308 and the strip 310 combined. At a first end of the device, the shear connector 300 has the sleeve 308, which can have a planar outside surface 311 configured to be placed adjacent to and in contact with the structural member 304. As with the other shear connectors 100, 200, 600 described above, the sleeve 308 has a width that generally corresponds to the width of the structural member 304 attached thereto. In the illustrated embodiment, the sleeve 308 has a width of about one and five-eighths of an inch (1⅝") and a length of about four feet (4'), though many variations of the length and width of the sleeve 308 are possible for varying applications. The sleeve 308 also has two retaining members 312, 313 that protrude inwardly at an angle from the planar member of the sleeve 308. The retaining members 312, 313 are configured to retain the strip 310 after the strip 310 has been slid into the sleeve 308.

In some embodiments, the shear connector 300 is directly attached to the structural member 304. In some embodiments, the sleeve 308 and the strip 310 have 314 apertures that are configured to allow a fastener, such as a structural screw or other suitable fastener, to pass through both the sleeve 308 and the strip 310 for attaching the structural member 304 to the shear connector 300. In some embodiments, the apertures 314 are generally equally spaced at intervals of about two inches (2"), about four inches (4"), or about six inches (6"). In the illustrated embodiment, pairs of apertures 314 spaced apart by about two inches (2") relative to each other and each pair can be separated from an adjacent pair by about four inches (4"). The apertures 314 can be placed substantially equidistant from both edges of the strip 310. Furthermore, in some embodiments, the thickness of the sleeve 308, defined as the distance between the outside surface 311 to an inside surface, can range from about one-sixteenth of an inch (1/16") to upwards of an inch (1") or more. In the illustrated embodiment, the thickness of the base is about one-eighth (⅛") of an inch.

With continued reference to FIG. 12, at a second end of the device, the shear connector 300 has a strip 310 that contains multiple hooked arms 318 configured to be embedded within the building material 302. The hooked arms 318 of the shear connector 300 have an extension portion 320 that, at a first end, extend inwardly from the strip 310 at an angle corresponding to the angle of the retaining members 312, 313. In the illustrated embodiment, the strip 310 and the hooked arms 318 form a single, integral unit. The multiple hooked arms 318 can be located along both edges of the strip 310 with adjacent hooked arms 318 extending along the opposite edge. Although not shown in the illustrated embodiment, a fillet can be placed along the interior corner at the intersection between the hooked member 318 and the strip 310 to reduce localized stresses and to reduce the possibility of failure at this point of the shear connector 300. The hooked arms 318 have a hooked member 322.

In some embodiments, the length of the hooked arm 318, defined as the distance between the top surface 323 of the strip and the uppermost portion of the inside surface 324 of the hooked member 322, can range from about one inch (1") to about two inches (2"). In the illustrated embodiment, the length of the hooked arm is about one and a quarter inches (1¼"). Furthermore, in the illustrated embodiment, the spacing of the multiple hooked arms 318 is about six inches (6") so that no hooked member interferes with the reinforcing mesh 306. Furthermore, in the illustrated embodiment, the hooked arms 318 are angled such that centers of the hooked members 322 are centered between both edges of the strip 310. Additionally, the hooked member 322 generally has a U-shaped cross-sectional area for chairing up a reinforcing mesh 306 when the device is embedded in a building panel 302. In the illustrated configuration, the hooked arms 318 alternate direction down the length of the shear connector 300. In some configurations, the hooked arms 318 may all face the same direction or have any suitable configuration of alternating directions.

Spacer and Strip Shear Connector

Figure 16:
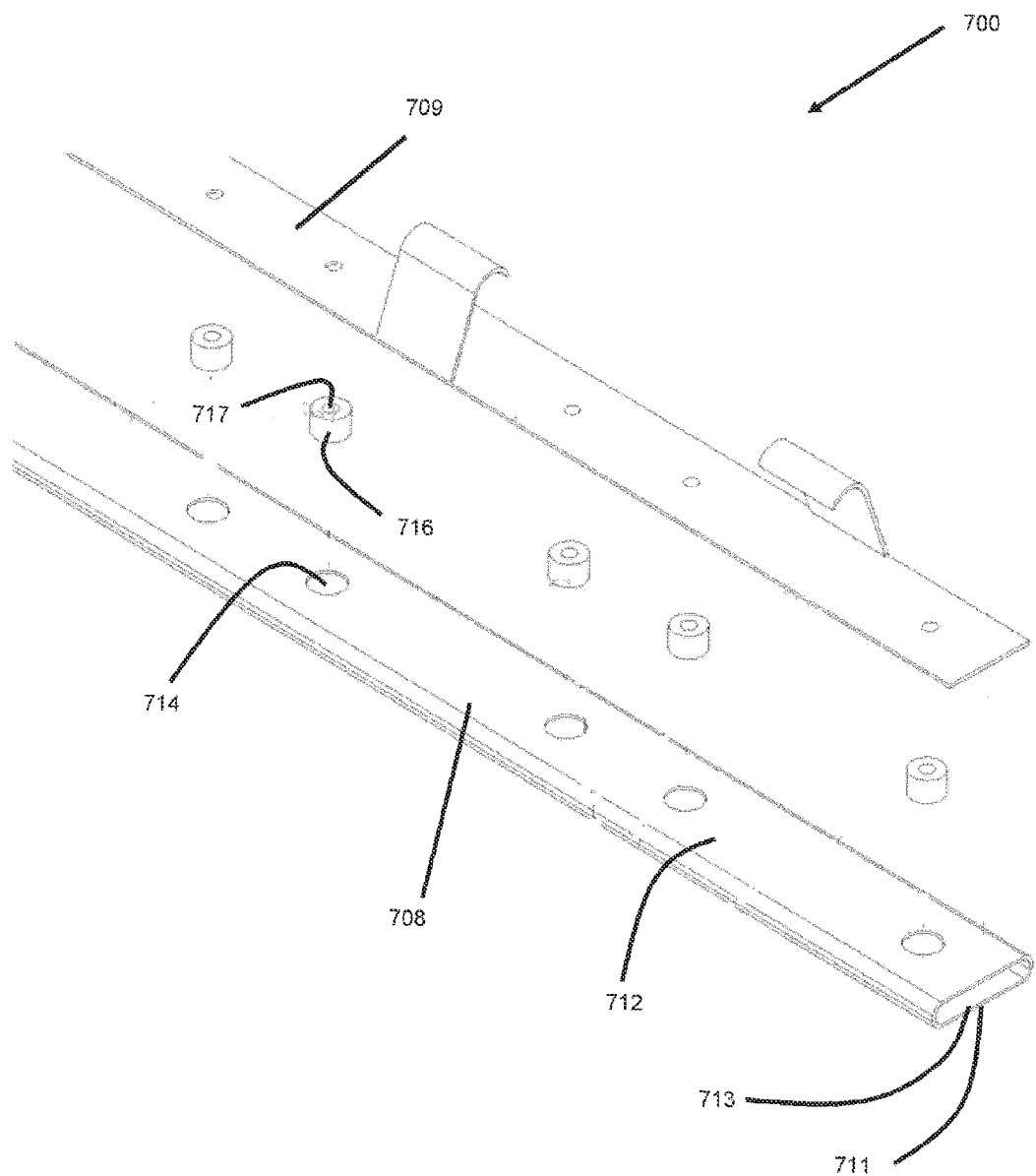
FIG. 16 is an exploded view of an embodiment of a spacer and strip shear connector.
Figure 17:
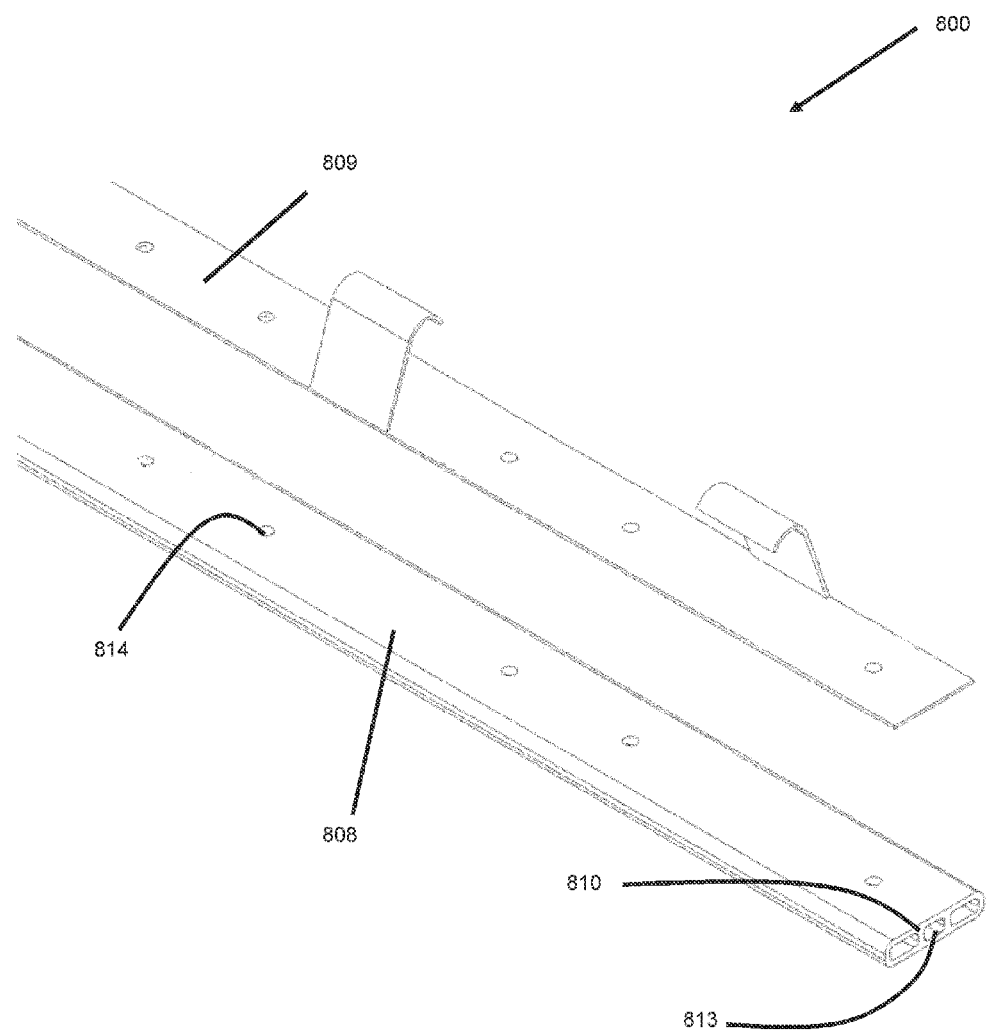
FIG. 17 is an exploded view of an embodiment of a spacer and strip shear connector.
Figure 18:
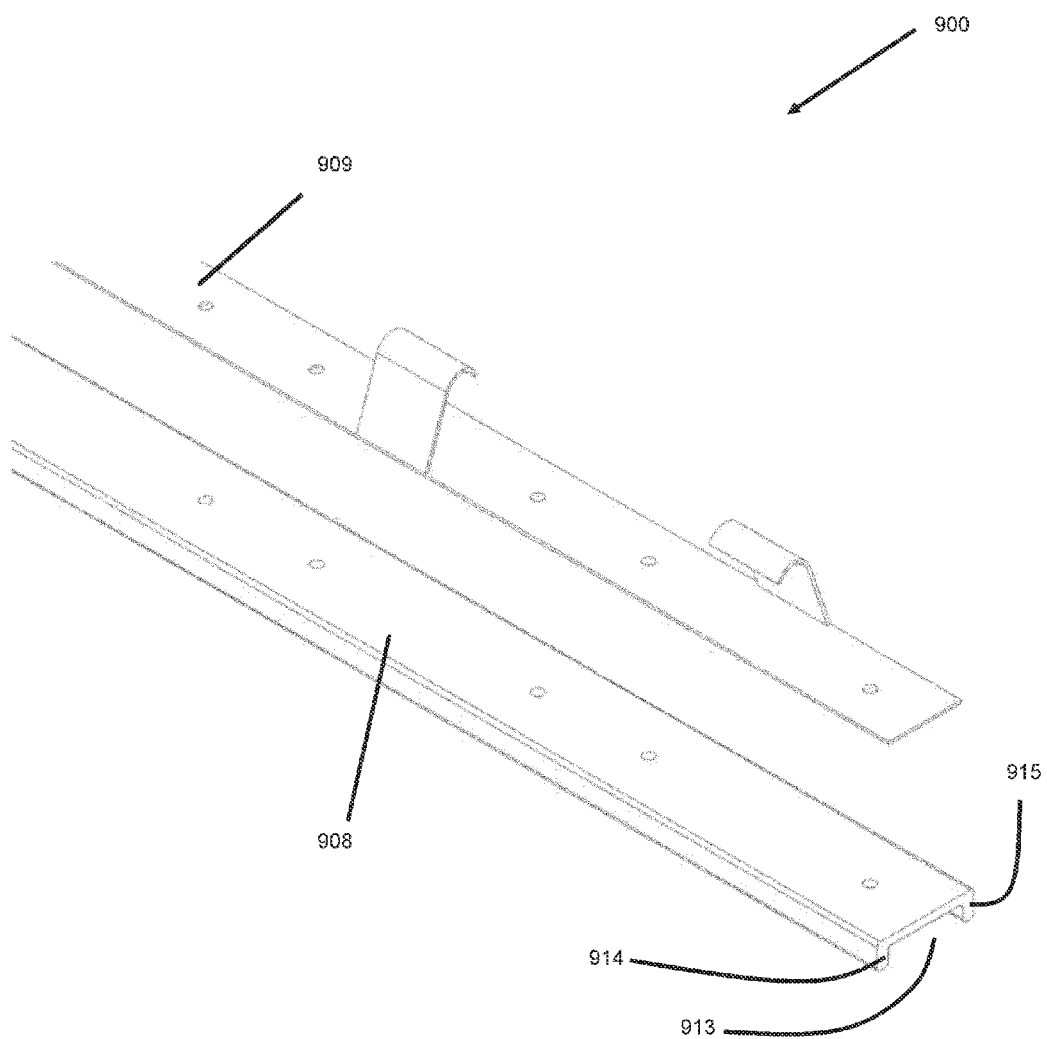
FIG. 18 is an exploded view of an embodiment of a spacer and strip shear connector.

FIGS. 16-18 are illustrations of embodiments of two-piece shear connectors configured to serve as an insulating attachment mechanism between a building panel and a structural member. As with the above-mentioned connectors, these embodiments of connectors are configured to transfer structural loads and limit heat flow between the building panel to the structural member. Furthermore, the general operating principles of the shear connectors described below are similar to those of the shear connectors described above. These embodiments of shear connectors are configured to chair up a reinforcing mesh when embedded in the building panel. As such, reference should be made to the general construction of shear connectors described above except as otherwise distinguished below.

FIG. 16 is an illustration of an embodiment of a shear connector 700 formed of two separate components—a spacer 708 and a strip 709—which are combined after manufacture into shear connector 700. The strip 709 can be identical to the strip 309 of the shear connector 300. Therefore, the strip 709 shares structural features, operational requirements, and advantages of the strip 309. As such, reference should be made to the description of the strip 309 for purposes of understanding the components and use of the strip 709.

The spacer 708 can be manufactured from a variety of materials such as, but not limited to, fiber reinforced polymer composites such as glass fiber reinforcement in a vinyl ester resin matrix. The spacer 708 has a planar outside surface 711 configured to be placed adjacent to and in contact with a structural member. As with the other shear connectors described above, the spacer 708 has a width that generally corresponds to the width of the structural member attached thereto. In the illustrated embodiment, the spacer 708 has a width of about one and five-eighths of an inch (1⅝") and a length of about four feet (4'), though many variations of the width and length of the spacer 708 are possible depending on the application of the spacer 708. The spacer 708, like the shear connector 600, has a channel 713 running throughout the length of the spacer 708. This channel may provide thermal insulation by providing a layer of insulating material or fluid, such as air, between the outside surface 711 and the inside surface 712. In other embodiments, the channel 713 may be filled with other material with thermal insulation characteristics more advantageous than materials used for the base 708. In some embodiments, the channel 713 has a width of about 1.450 inches and a thickness of about 0.200 inches, though many variations of the width and length of the channel 713 are possible depending on the application of the channel 713. In some embodiments, the width may be increased and the thickness may be increased to potentially provide more advantageous thermal characteristics. In some embodiments, the width and/or thickness may be decreased to provide more structural rigidity for the base 708. Plugs may be used at one or both ends of the channel 713 to reduce or eliminate the likelihood that concrete ingresses into the channel while concrete is being poured.

The spacer 708 can have apertures 714 that are configured to allow a fastener, such as a structural screw or other suitable fastener, to pass through both the spacer 708 and the strip 709 for attaching the structural member to the shear connector 700. As discussed above with respect to the other embodiments of the shear connectors, the number, spacing, and size of apertures can be determined based on the desired performance characteristics.

The support members 716 can be inserted into the apertures 714. When used, the support members 716 can be sized such that the bottom surface of the support members 716 are in contact with an inner surface of the spacer 708 and a top surface of the support members are in contact with a bottom surface of the strip 709. Furthermore, the support members 716 may additionally include an aperture 717 running longitudinally through the support member 716 and configured to receive a fastener. As such, the support members 716 may be configured to allow the shear connector 700 to better maintain structural integrity when in the presence of compressive loads.

FIG. 17 is an illustration of an embodiment of a shear connector 800 formed of two separate components—a spacer 808 and a strip 809—which can be combined after manufacture into shear connector 800. The strip 809 can be identical to the strip 309 of the shear connector 300. Therefore, the strip 809 shares structural features, operational requirements, and advantages of the strip 309. As such, reference should be made to the description of the strip 309 for purposes of understanding the components and use of the strip 809.

The spacer 808 can be similar to the spacer 708 of the shear connector 700. However, the spacer 808 contains internal webs or struts 810 running throughout portions of or the entire length of the channel 813. The webs or struts 810 provide additional structural integrity for the spacer 808 to reduce the likelihood of buckling and collapse. The webs or struts 810 can be placed on both sides of the apertures 814. In some embodiments, the channel 913 may be separated into three separate channels by the webs or struts 810. The plugs may be used at one or both ends of the channel 813 to reduce or eliminate the likelihood that concrete ingresses into the channel while concrete is being poured.

FIG. 18 is an illustration of an embodiment of a shear connector 900 formed of two separate components—a spacer 908 and a strip 909—which are combined after manufacture into the shear connector 900. The strip 909 can be identical to the strip 309 of the shear connector 300. Therefore, the strip 909 shares structural features, operational requirements, and advantages of the strip 309. As such, reference should be made to the description of strip 309 for purposes of understanding the components and use of strip 909.

The spacer 908 is similar to the spacer 708 of the shear connector 700. However, the spacer 908 has a partially-enclosed channel 913. In the illustrated embodiment, the channel 913 has a "C-shaped" cross-section with outer panels 914, 915 configured to contact and abut a structural member. The reduced interface area between the spacer 908 and the structural member advantageously provides reduced thermal transfer between the spacer 908 and the structural member.

Figure 19:
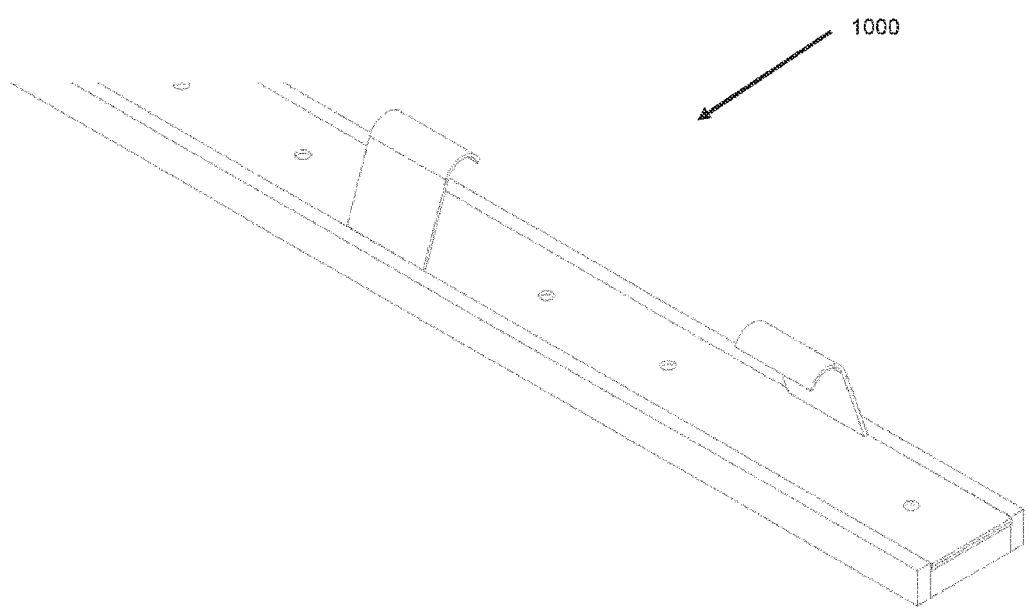
FIG. 19 is a perspective view of an embodiment of a spacer and strip shear connector.
Figure 20:
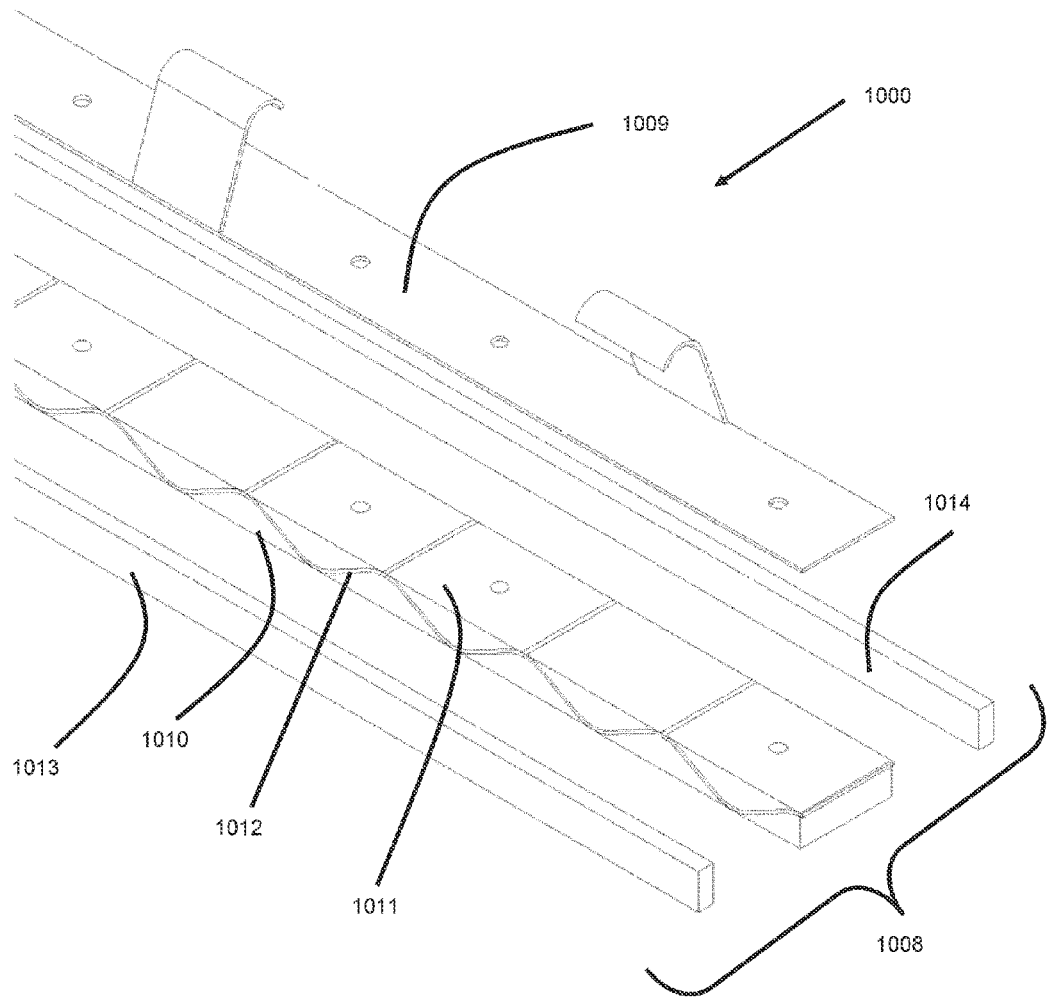
FIG. 20 is an exploded view of the spacer and strip shear connector of FIG. 19.
Figure 21:
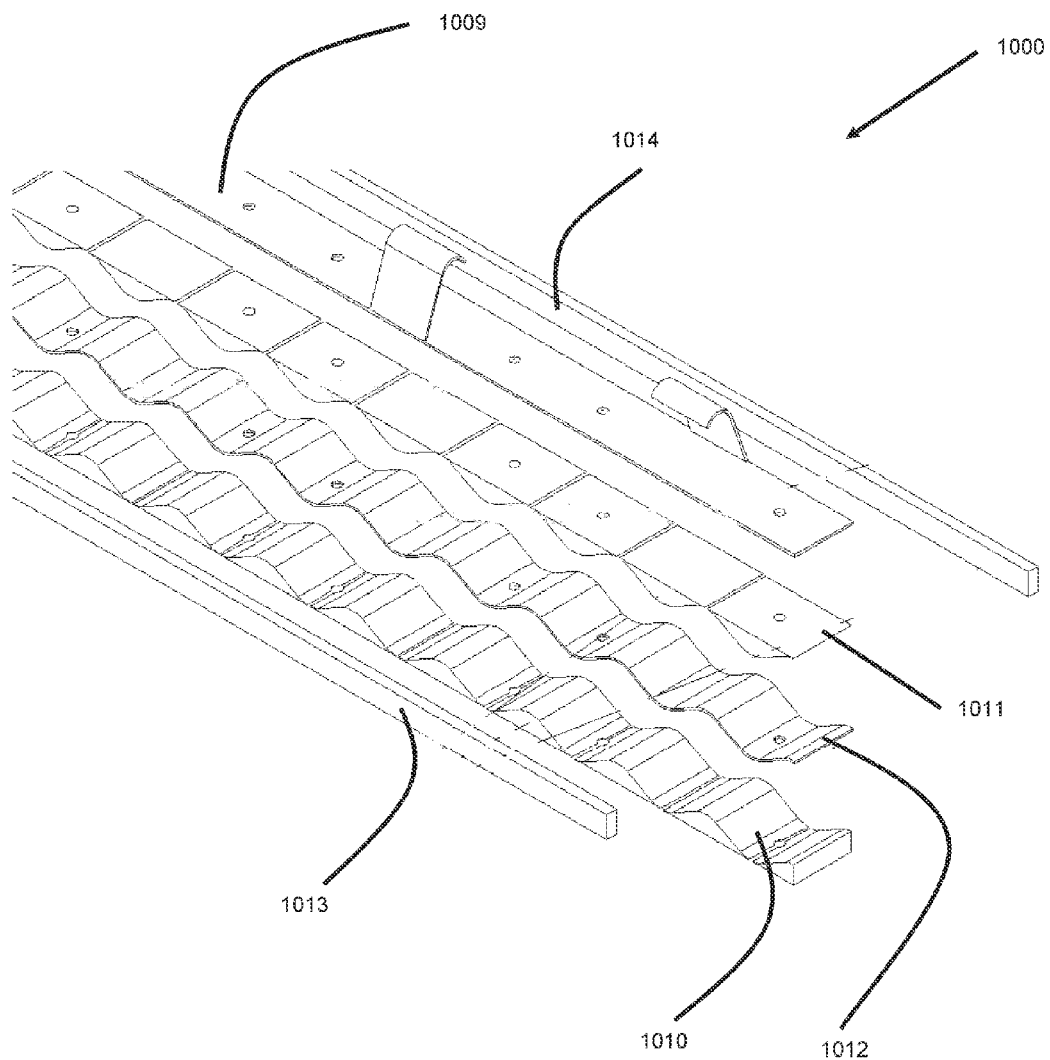
FIG. 21 is a further exploded view of the spacer and strip shear connector of FIG. 19.

FIGS. 19-21 are illustrations of an embodiment of a shear connector 1000 formed of two base components—a spacer 1008 and a strip 1009—that are combined after manufacture into the shear connector 1000 (as shown in FIG. 19). The strip 1009 can be identical to the strip 309 of the shear connector 300. Therefore, the strip 1009 shares structural features, operational requirements, and advantages of the strip 309. As such, reference should be made to the description of strip 309 for purposes of understanding the components and use of the strip 1009.

As illustrated more clearly in FIG. 20, the spacer 1008 is formed of multiple components, such as an outside insulation member 1010, an inside insulation member 1011, a reinforcement member 1012, and side insulation panels 1013, 1014. The outside insulation member 1010 is configured to be placed adjacent to and in contact with a structural member. The inside insulation member 1011 is configured to be placed adjacent to and in contact with the strip 1009. Placed between both the outside insulation member 1010 and the inside insulation member 1011 is a reinforcement member 1012 configured provide greater structural integrity for the spacer 1008 when fully assembled. In the illustrated embodiment, the structural member has a sinusoidal shape to minimize contact surface area with the structural member as well as to provide a means of increasing the strength-to-weight ratio in this particular application. By reducing the contact area, the heat flow can be reduced between the structural member and the concrete panel through the connector 1000. Other shapes may be used such as triangle waves, square waves, arched waves, and other similar shapes. The insulation members 1010 and 1011 have surfaces that correspond to the shape of the structural member 1012, such that, when assembled together, the members 1010, 1011, 1012 fit snugly. The side insulation panels may be placed along the two sides of the spacer 1008 to provide additional thermal insulation. Additionally, the side insulation panels 1013, 1014 may also be sized such that they also cover the side edges of the strip 1009 when the shear connector 1000 is fully assembled.

In the illustrated embodiment, the insulation members 1010, 1011, as well as the side insulation panels 1013, 1014, can be manufactured from insulating foam material. In some embodiments, other insulating materials may be used. The structural member 1012 and/or the strip 1009 can be manufactured from a fiber reinforced polymer composite or metals such as steel, stainless steel, or similar materials. In one method of manufacturing the spacer 1008, the structural member 1012 and the strip 1009 are placed in a rectangular mold with the structural member 1012 and the strip 1009 located in the preferred location for the shear connector 1000. An expanding foam material may then be introduced into the rectangular mold, which will expand to fill the mold and create the structure of shear connector 1000. The spacer 1008 may then enter post-processing, where apertures may be drilled and the individual pieces may be separated to facilitate transportation of shear connectors 1000.

One or more of the insulation members 1010, 1011, and the side insulation panels 1013, 1014, may be omitted from the shear connector 1000 if the concrete panel is cast with a gap between the inside surface of the strip 1009 and the concrete panel. In such cases, an insulating material with a low thermal conductivity, such as a spray-on foam or a spray-on fiberglass, can be used to fill in the gap between the building panel (e.g., the concrete panel) and the inside surface of the rail 1009, as well as the gaps around the structural member 1012.

Base and Individual Hook Shear Connector

Figure 13:
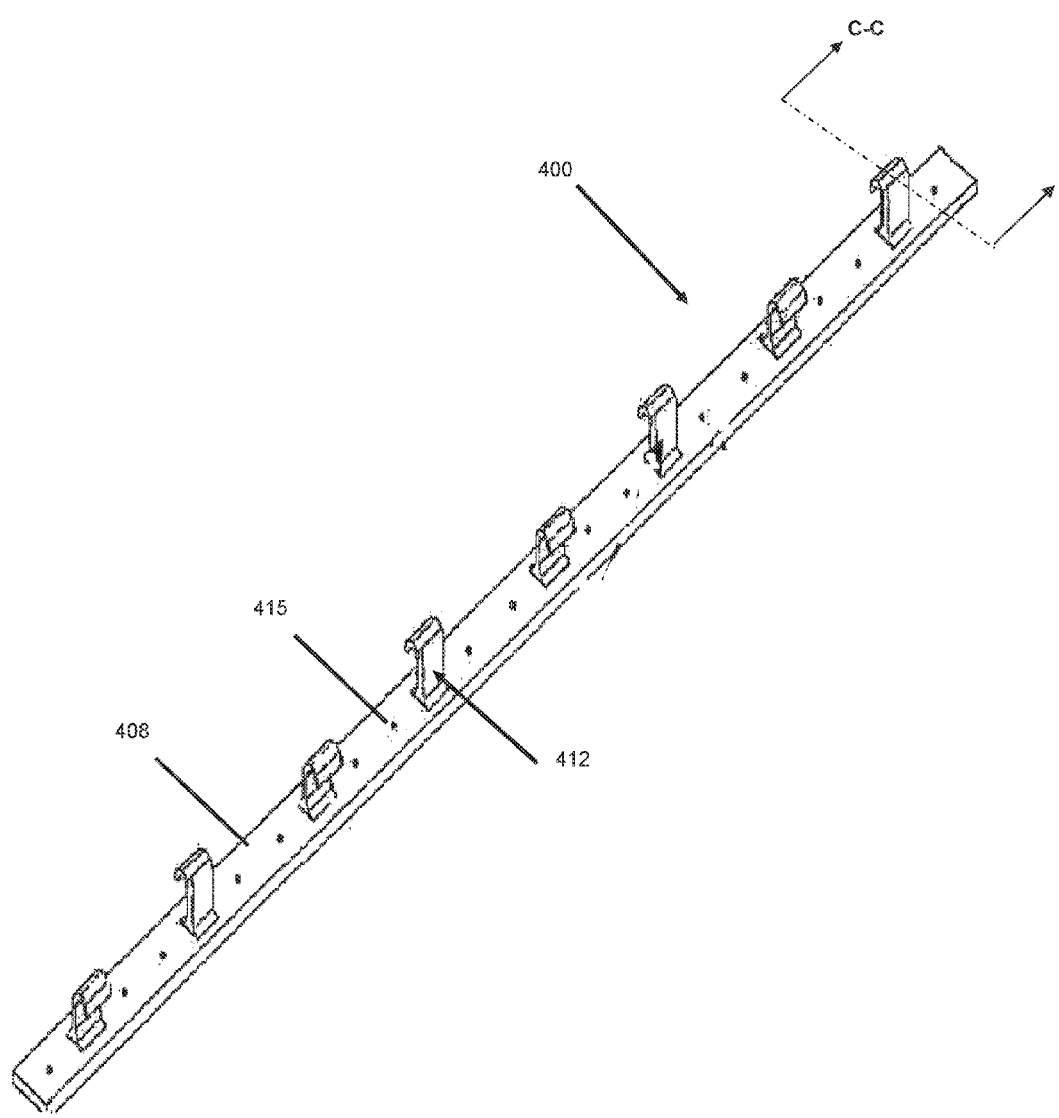
FIG. 13 is a perspective view of an embodiment of a shear connector with a base and individual hooks.
Figure 14:
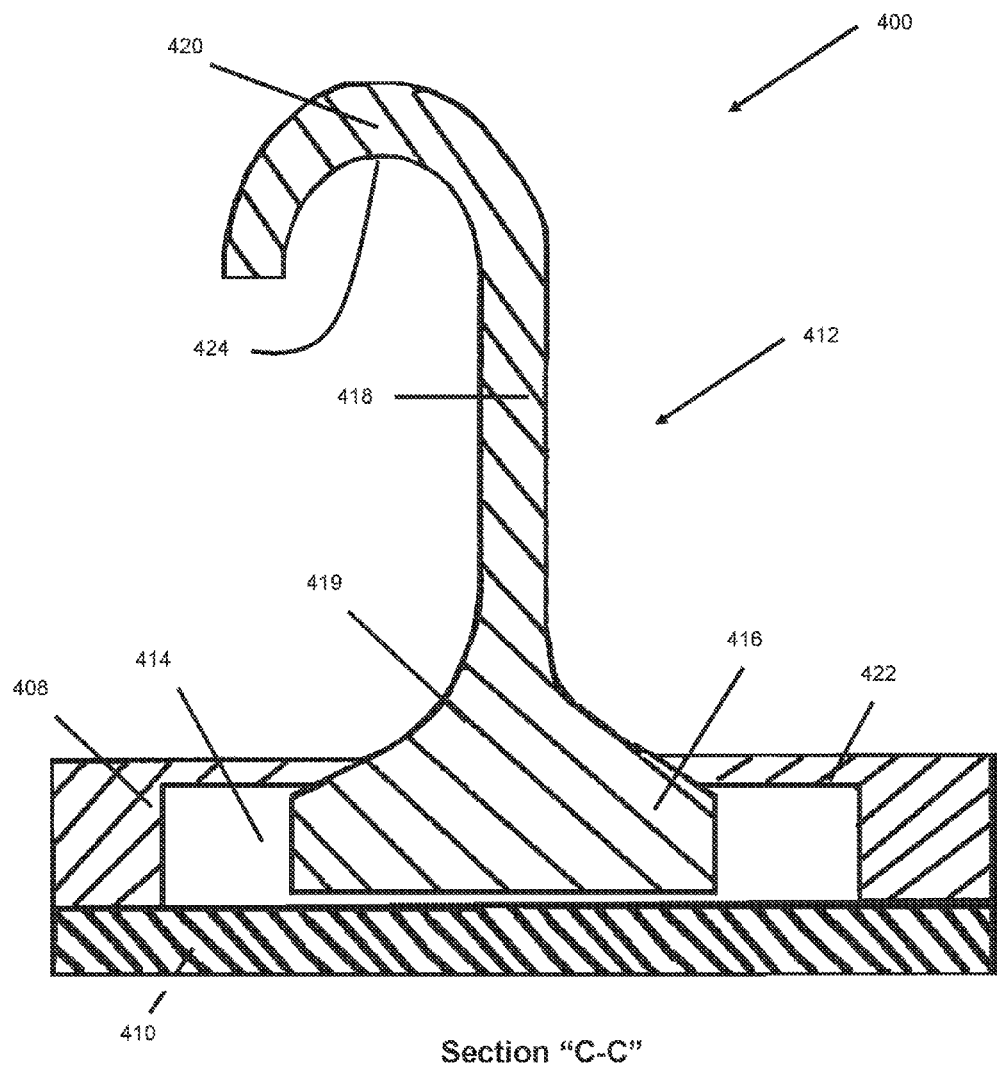
FIG. 14 is a sectional view of the shear connector of FIG. 13 along line C-C.

FIGS. 13 and 14 are illustrations of an embodiment of a shear connector 400 that is configured to serve as an insulating attachment mechanism between a building panel 402 and a structural member 404. As with the above-mentioned shear connectors 100, 200, 300, the shear connector 400 is configured to transfer structural loads and limit heat flow between the building panel 402 and the structural member 404. Furthermore, the general operating principles of the shear connector 200 are similar to that of the shear connectors 100, 200, 300. The shear connector 400 is configured to chair up a reinforcing mesh 406 when embedded in the building panel 402. As such, reference should be made to the general construction of shear connectors 100, 200, 300 except as otherwise distinguished below.

With reference to FIG. 14, which is a front section view of the shear connector 400, the shear connector 400 is formed of multiple components—a base 408, a retaining strip 410, and multiple hooked arms 412—that are combined after manufacture to form the assembled shear connector 400. The base 408 incorporates multiple apertures 414 that receive the hooked arms 412. In the illustrated embodiment, the apertures 414 are spaced at a distance of about six inches (6") although, in some embodiments, other spacing can be used depending on factors such as, but not limited to, the type of retaining mesh 406 being used and the desired pull-out strength of the shear connector 400. Furthermore, the apertures 414 can be offset from the center, such that, when inserted, the adjacent hooked arms 412 can be placed facing opposite directions (as shown in FIG. 13). In some embodiments, the hooked arms 412 face in the same direction. In order to reduce or eliminate the likelihood that the hooked arms 412 will fall out of the base 408 after insertion, the retaining strip 410 can be glued or otherwise secured to the bottom of base 408. In some embodiments, the retaining strip 410 is disposed of prior to attaching the shear connector 400 to the structural member 404. In other embodiments, the retaining strip 410 remains attached such that it is placed between the base 408 and the structural member 404 after construction.

The base 408 also includes additional apertures 415 that allow fasteners, such as screws or the like, to pass therethrough for attaching the structural member 404 to the shear connector 400. In some embodiments, the apertures 415 are generally equally spaced at intervals of about two inches (2"), about four inches (4"), or about six inches (6"). In the illustrated embodiment, the apertures 415 are spaced at intervals of about two inches (2") between adjacent apertures 416 and about four inches (4") between apertures separated by the hooked arms 412. The spacing of the apertures 415 can vary widely. In embodiments where the retaining strip 410 remains attached to the base 408 when the shear connector 400 is attached to the structural member 404, the retaining strip 410 can have apertures that correspond to the apertures 415 on the base 408.

At the end of the hooked arms 412, which are inserted into the base 408, the hooked arms 412 include a retaining member 416 for allowing the hooked arm 412 to remain inserted in the base 408 after being placed within the base 408. In some embodiments, the retaining member 416 takes the form of wings or bayonets allowing the hooked arms 412 to be inserted from above the base 408. This snap-fit connection mechanism may also take the form of other deformable protrusions that significantly deform when subject to forces in one direction (i.e., during insertion into the base 408) but which provide significant resistance when subject to forces in the opposite direction (i.e., during removal from the base 408). In some embodiments, the hooked arms 412 can be inserted through the bottom of the base 408 and therefore could use non-deformable retaining members 416.

The hooked arms 412 also have an extension portion 418 that extends from the retaining member 416. A fillet 419 can be placed at the edge of the retaining member 416 and the extension member 420 in order to reduce localized stresses and reduce the possibility of failure at these points of the shear connector 400. At the other end of the hooked arms 412 are hooked members 420 configured to chair up the reinforcing mesh 406. In the illustrated embodiment, the hooked arms 412 only have a single hooked member 420 extending in a single direction. In other embodiments, a dual-member design, such as that of shear connector 200, can be used.

In some embodiments, the length of the hooked arm 412, defined as the distance between the inside surface 422 of the base 408 and the uppermost portion of the inside surface 424 of the hooked member 420, can range from about one inch (1") to about two inches (2"). In the illustrated embodiment, the length of the hooked arm is about one and a quarter inches (1¼").

The base 408 can be manufactured from a variety of materials such as, but not limited to, fiber reinforced polymer composite materials. In the illustrated embodiment, the base 408 is manufactured from a composite, such as glass fiber reinforcement in a vinyl ester resin matrix. The retaining strip 410 can also be manufactured from the same materials as the base 408. However, in some embodiments where the retaining strip 410 is discarded prior to attaching the shear connector 400 to the structural member 404, the retaining strip 410 may instead be manufactured from cheaper materials. The individual hooked arms 412 can also be manufactured from a variety of materials such as, but not limited to, metals including stainless steel and titanium, composites, and plastics. In the illustrated embodiment, the hooked arms 412 are manufactured from plastics. Separating the shear connector 400 into multiple components can significantly reduce the costs of manufacture by allowing, for example, the base 408 and the retaining strip 410 to be extruded with little post-manufacturing processing such as milling thus reducing costs associated with labor and material waste. The individual hooked arms 412 can then be cast separately.

With continued reference to FIG. 14, as with the other shear connectors 100, 200, 300 described above, the base 408 has a width that generally corresponds to the width of the structural member 404 attached thereto. In the illustrated embodiment, the base 408 has a width of about one and five-eighths of an inch (1⅝") and a length of about four feet (4'), though many variations in the length and width of the base 408 are possible. Furthermore, in some embodiments, the thickness of the base 408, defined as the distance between a bottom-most surface and a top-most surface of the base 408, can range from about one-sixteenth of an inch (1/16") to upwards of about an inch (1") or more. In the illustrated embodiment, the thickness of the base is about three-tenths of an inch (3/10"). However, in embodiments where the base 408 is spaced from the building panel 402, the thickness can advantageously be reduced. In other embodiments, the thickness can be increased to further increase the U-value of the system.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A shear connector assembly for attaching a structural member to a building panel, the connector assembly comprising:
   a connector strip comprising:
      a first strip face;
      a second strip face opposite the first strip face;
      one or more apertures extending through the connector strip in a direction perpendicular to the first strip face; and
      one or more hooked members extending from the first strip face;
   a spacer system positioned on a side of the connector strip opposite the one or more hooked members, the spacer system comprising:
      one or more support members; and
      a thermally-insulating material positioned between the one or more support members in a direction parallel to the second strip face;
   one or more fasteners configured to connect the connector strip to the spacer system, the one or more fasteners extending through the one or more apertures of the connector strip such that at least a portion of the spacer system contacts the second strip face of the connector strip.

2. The shear connector assembly of claim 1, wherein the one or more support members have a cylindrical shape.

3. The shear connector assembly of claim 1, wherein the thermally-insulating material is positioned within a hollow spacer.

4. The shear connector assembly of claim 1, wherein the support members are positioned within apertures of a hollow spacer.

5. The shear connector assembly of claim 1, wherein each of the one or more hooked members extend from a lateral edge of the first strip face in a direction away from the second strip face.

6. The shear connector assembly of claim 5, wherein each of the one or more hooked members extend toward a lateral edge of the first strip face opposite the lateral edge from which the hooked member extends.

7. The shear connector assembly of claim 1, wherein a head of each of the one or more fasteners is positioned on the first strip face when the connector strip is connected to the spacer system.

8. The shear connector assembly of claim 1, wherein each of the one or more support members has an aperture therethrough.

* * * * *